(12) United States Patent
Takahashi

(10) Patent No.: US 8,358,202 B2
(45) Date of Patent: Jan. 22, 2013

(54) SEMICONDUCTOR DEVICE

(75) Inventor: Yasuyuki Takahashi, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 884 days.

(21) Appl. No.: 12/003,113

(22) Filed: Dec. 20, 2007

(65) Prior Publication Data

US 2008/0174408 A1 Jul. 24, 2008

(30) Foreign Application Priority Data

Dec. 26, 2006 (JP) ................................. 2006-350019

(51) Int. Cl.
*H04Q 5/22* (2006.01)
(52) U.S. Cl. ........ 340/10.3; 340/10.1; 438/155; 329/349
(58) Field of Classification Search .................. 340/10.3
See application file for complete search history.

(56) References Cited

U.S. PATENT DOCUMENTS

| | | | |
|---|---|---|---|
| 3,748,582 A * | 7/1973 | Ohsawa | 455/155.1 |
| 5,483,207 A | 1/1996 | Gabara | |
| 6,321,067 B1 | 11/2001 | Suga et al. | |
| 6,377,411 B1 * | 4/2002 | Katsumata et al. | 360/46 |
| 6,427,065 B1 | 7/2002 | Suga et al. | |
| 6,489,833 B1 * | 12/2002 | Miyazaki et al. | 327/534 |
| 6,522,083 B1 * | 2/2003 | Roach | 315/224 |
| 6,791,457 B2 | 9/2004 | Shimura | |
| 6,906,596 B2 | 6/2005 | Kitamura et al. | |
| 7,045,877 B2 * | 5/2006 | Umemoto et al. | 257/567 |
| 7,317,378 B2 * | 1/2008 | Jarvis et al. | 340/10.1 |
| 7,508,265 B2 * | 3/2009 | Lin | 330/255 |
| 2004/0212741 A1 | 10/2004 | Hijikata et al. | |
| 2005/0122644 A1 * | 6/2005 | Ma et al. | 361/56 |
| 2005/0280509 A1 | 12/2005 | Tanaka et al. | |
| 2006/0250220 A1 * | 11/2006 | Stewart | 340/10.4 |
| 2008/0079565 A1 * | 4/2008 | Koyama | 340/539.12 |

FOREIGN PATENT DOCUMENTS

| | | |
|---|---|---|
| EP | 0829940 A | 3/1998 |
| EP | 1223057 A | 7/2002 |
| JP | 10-145987 A | 5/1998 |
| JP | 2002-209343 A | 7/2002 |
| JP | 2006-005651 | 1/2006 |

* cited by examiner

*Primary Examiner* — George Bugg
*Assistant Examiner* — Anthony D Afrifa-Kyei
(74) *Attorney, Agent, or Firm* — Eric J. Robinson; Robinson Intellectual Property Law Office, P.C.

(57) ABSTRACT

It is an object to provide a highly reliable semiconductor device which operates normally even when a communication distance is extremely short. A semiconductor device which transmits/receives data by wireless communication includes a comparison circuit which compares electric power supplied form outside with electric power serving as a reference; a bias circuit portion which outputs a protection signal and a modulation signal in accordance with output of the comparison circuit; and a protection/modulation circuit which performs protection to prevent degradation and breakdown of elements of the semiconductor device and modulation to transmit data, with one circuit.

21 Claims, 19 Drawing Sheets

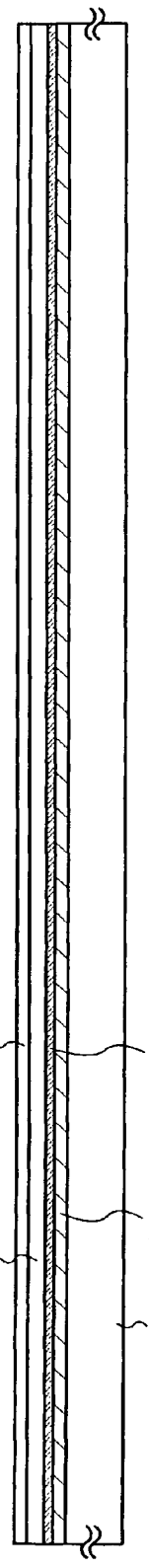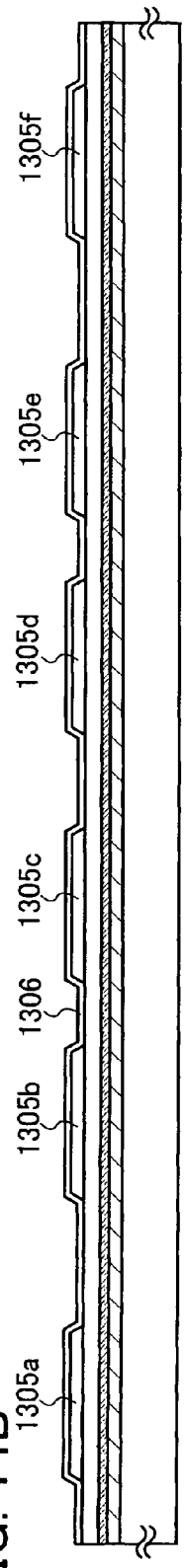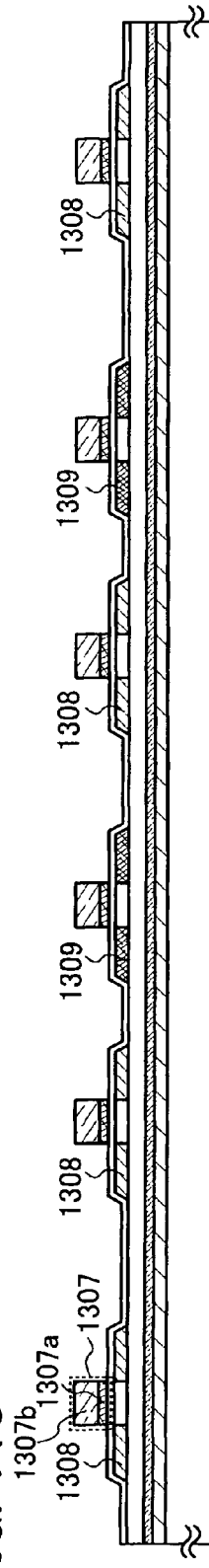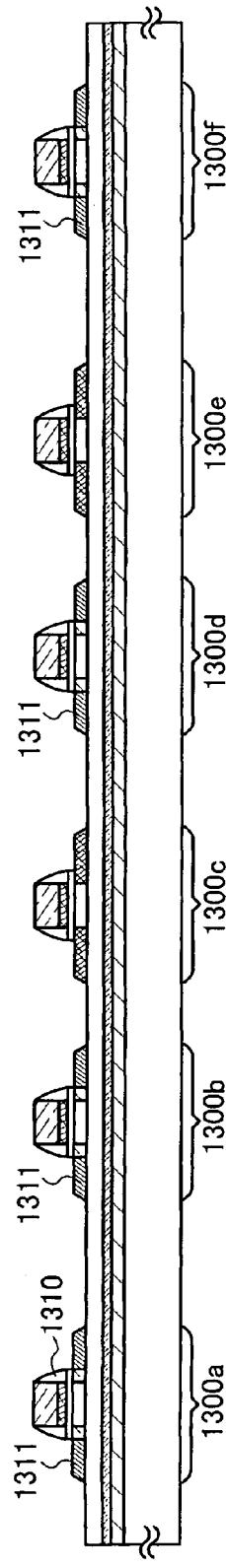

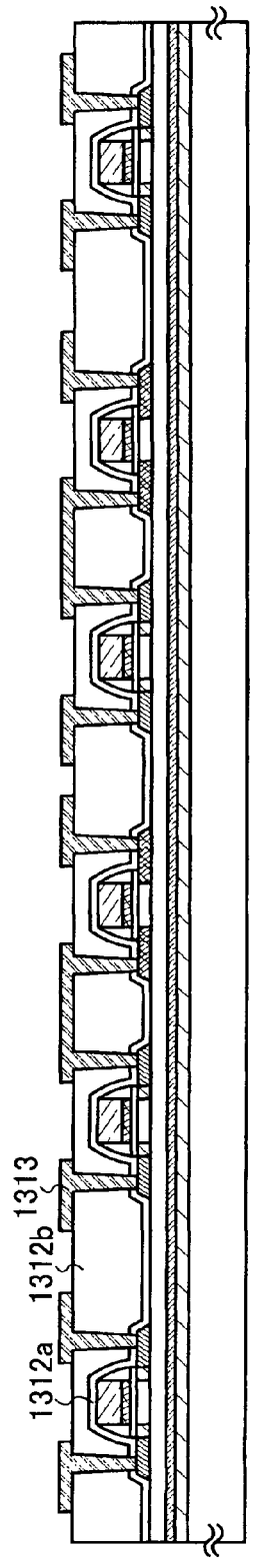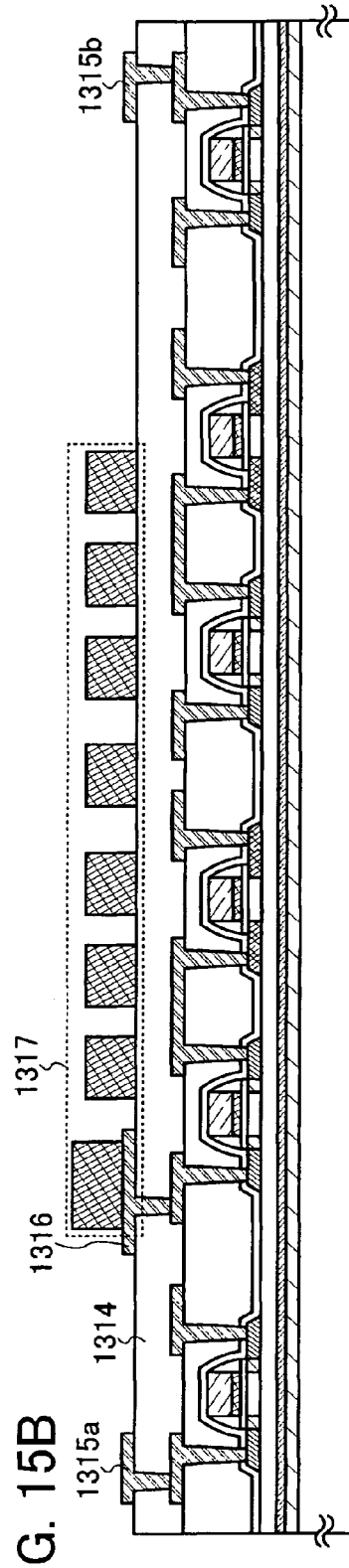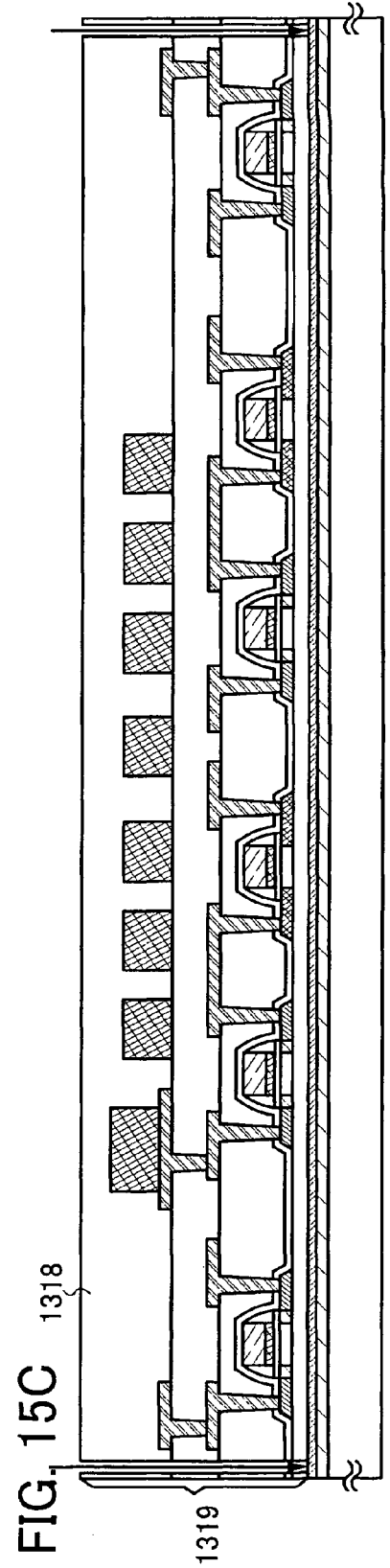

SEMICONDUCTOR DEVICE

BACKGROUND OF THE INVENTION

1. Field of the Invention

The present invention relates to a semiconductor device which performs reception/transmission of a data by wireless communication. Further, the present invention relates to a semiconductor device having a function of operating a protection circuit and a modulation circuit with one circuit, in which the protection circuit prevents degradation and breakdown of elements of a chip in the semiconductor device particularly when a large amount of electric power is received in wireless communication, and the modulation circuit is operated by data transmission.

2. Description of the Related Art

In recent years, an individual identification technology using wireless communication (hereinafter referred to as a wireless communication system) has attracted attention. In particular, an individual identification technology with a semiconductor device utilizing an RFID (radio frequency identification) technology as a data carrier which transmits/receives data by wireless communication has attracted attention. Such a semiconductor device which can transmit/receive data by wireless communication can be used as, for example, an RF tag (also called an IC (integrated circuit) tag, an IC chip, an RFID tag, a wireless tag, or an electronic tag) and has started to be used for production, management, or the like of an individual object and application thereof to personal authentication is also advancing.

A wireless communication system herein is a communication system which wirelessly exchanges data between a power supply source also serving as a transceiver such as a reader/writer and a transceiver such as a semiconductor device.

The wireless communication system does not need a physical connection between the reader/writer and the semiconductor device. That is, as long as the semiconductor device exists in a region designated by the reader/writer, a data can be exchanged by communication between the reader/writer and the semiconductor device.

In order to extend the communication distance between the reader/writer and semiconductor device, research and development for increasing the power supply efficiency from the reader/writer to the semiconductor device has been activated (e.g., reference 1: Japanese Published Patent Application No. 2006-5651).

SUMMARY OF THE INVENTION

Meanwhile, in the wireless communication system, when data in a plurality of semiconductor devices is read by a reader/writer at the same time, the distance between the reader/writer and each semiconductor device (hereinafter referred to as a communication distance) is not the same. Further, the communication distance may vary from hour to hour, like the case where a carton of products provided with a semiconductor device passes a reader/writer by using a forklift truck.

In general, electric power is attenuated in proportion to the squared distance between a radiant point of electric power and a measurement point of the electric power. That is, depending on the communication distance, electric power supplied from the reader/writer to the semiconductor device varies in level.

Therefore, particularly when the communication distance is extremely short, such as the case where the reader/writer and the semiconductor device are in contact with each other, a large amount of electric power is supplied to the semiconductor device. When a large amount of electric power is supplied to the semiconductor device, elements in the semiconductor device are degraded due to electrical stress or heat. In the worst case, the semiconductor device itself could be broken.

There is a method in which, even when a large amount of electric power is supplied, the electric power is divided by providing a protection circuit inside a tag to suppress degradation/breakdown of the elements. However, in this method, the protection circuit consumes electric power also when it does not perform protection; therefore, there is a concern that the maximum communication distance is reduced by providing the protection circuit, compared to a semiconductor device without a protection circuit.

The present invention is made in view of the above problems, and its purpose is to provide a highly reliable semiconductor device which operates normally even when a communication distance is extremely short.

The present invention is made in view of the above problems. The present invention has a feature that a semiconductor device which transmits/receives data by wireless communication includes a comparison circuit, a bias circuit portion, and a protection/modulation circuit portion: the comparison circuit compares electric power supplied from outside with electric power serving as a reference, the bias circuit portion outputs a protection signal and a modulation signal in accordance with the output of the comparison circuit, and the protection/modulation circuit performs protection to prevent degradation and breakdown of elements in the semiconductor device and modulation to transmit data, with one circuit.

A semiconductor device of the present invention includes an antenna and a chip. The chip includes a comparison circuit, a bias circuit portion, and a protection/modulation circuit. The comparison circuit compares an input voltage supplied through the antenna with a reference voltage and outputs a voltage in accordance with the input voltage. A modulation signal and a voltage (also called as a bias signal) outputted from the comparison circuit are inputted to the bias circuit portion, and the bias circuit portion outputs one or both of the modulation signal and a protection signal. The protection/modulation circuit is provided with a switch which operates in accordance with one or both of the modulation signal and the protection signal outputted from the bias circuit portion.

A semiconductor device of the present invention includes a first antenna, a second antenna, a chip, and a battery. The chip includes a comparison circuit, a bias circuit portion, and a protection/modulation circuit. The comparison circuit compares input voltage supplied through the antenna with a reference voltage and outputs a voltage in accordance with the input voltage. A modulation signal and a voltage (also called as a bias signal) outputted from the comparison circuit are input to the bias circuit portion, and the bias circuit portion outputs one or both of the modulation signal and a protection signal. The protection/modulation circuit is provided with a switch which operates in accordance with one or both of the modulation signal and the protection signal outputted from the bias circuit portion. The battery stores electric power supplied through the second antenna.

Note that being "connected" in this specification means being "electrically connected".

Note that in this specification, various modes of transistors can be used, and the type of a transistor which can be applied is not limited to a certain type. A thin film transistor (TFT) using a non-single crystalline semiconductor film typified by amorphous silicon or polycrystalline silicon, a transistor formed by using a semiconductor substrate or an SOI substrate, a MOS transistor, a junction transistor, a bipolar transistor, a transistor using a compound semiconductor such as ZnO or a-InGaZnO, a transistor using an organic semiconductor or a carbon nanotube, or other transistors can be applied. The non-single crystalline semiconductor film may contain hydrogen or halogen. In addition, the type of a substrate over which a transistor is formed can be various and is not limited to a certain type. Therefore, for example, a single crystalline substrate, an SOI substrate, a glass substrate, a quartz substrate, a plastic substrate, a paper substrate, a cellophane substrate, a stone substrate, or the like can be used. Alternatively, a transistor may be formed over a certain substrate and transferred to another substrate.

When the circuits are formed using the same substrate, the number of component parts can be reduced to cut cost and the number of connections to other circuit components can be reduced to improve reliability. Alternatively, part of the circuits may be formed using one substrate and another part of the circuits may be formed using another substrate. That is, not all of the circuits are required to be formed using the same substrate. For example, part of the circuits may be formed with transistors using a glass substrate, another part of the circuits may be formed using a single crystalline substrate, and an IC chip thereof may be connected to the glass substrate by COG (chip on glass) and the IC chip may be provided over the glass substrate. Alternatively, the IC chip may be connected to the glass substrate by TAB (tape automated bonding) or a printed wiring board. When part of the circuits are formed using the same substrate in this manner, the number of the component parts can be reduced to cut cost and the number of connections to the circuit components can be reduced to improve reliability. In addition, for example, when a portion with high driving voltage and a portion with high driving frequency are not formed using the same substrate, increase in power consumption can be prevented.

As a structure of a transistor applied to a data carrier of the present invention, for example, a multi-gate structure with two or more gate electrodes may be employed. With the multi-gate structure, off current can be reduced, reliability can be improved by improvement in withstand voltage of the transistor, and current between a drain terminal and a source terminal does not change very much even if voltage between the drain terminal and the source terminal changes when the transistor operates in a saturation region, and flat characteristics can be obtained. In addition, a structure in which gate electrodes are formed above and below a channel may be used. With such a structure in which gate electrodes are formed above and below a channel, the area of a channel region can be enlarged to increase the amount of current, and a depletion layer can be easily formed to decrease the subthreshold swing. In addition, any of the following structures may be employed: a structure in which a gate electrode is formed above a channel; a structure in which a gate electrode is formed below a channel; a staggered structure; an inverted staggered structure; and a structure in which a channel region is divided into a plurality of regions and the plurality of channel regions are connected in parallel or in series. In addition, a channel region (or part of it) may overlap with a source electrode or a drain electrode. With a structure in which a channel region (or part of it) overlaps with a source electrode or a drain electrode, an unstable operation caused by electric charge accumulated in part of the channel can be prevented. In addition, an LDD region may be provided in each of the source region and drain region. When the LDD region is provided, off current can be reduced, reliability can be improved by improvement in withstand voltage of the transistor, and current between a drain terminal and a source terminal does not change very much even if voltage between the drain terminal and the source terminal changes when the transistor operates in a saturation region, and flat characteristics can be obtained.

With the use of the present invention, impedances of the antenna and the chip included in the semiconductor device can intentionally be made not to match each other, and further, a degree of impedance matching can be controlled with a tag, whereby protection and modulation can be performed with one circuit. Accordingly, operating failures can be prevented, which occur when the semiconductor device receives a large amount of electric power in a condition in which a communication distance between the semiconductor device and a reader/writer is extremely short and the like. Therefore, the semiconductor device can be operated normally without degrading the elements in the semiconductor device and breaking the semiconductor device. Further, by performing protection and modulation with one circuit, the maximum communication distance of a semiconductor device without a protection function can be maintained.

BRIEF DESCRIPTION OF THE DRAWINGS

In the accompanying drawings:

FIGS. 14A to 14D are views each showing an example of a method for manufacturing a semiconductor device of the present invention;

FIGS. 15A to 15C are views each showing an example of a method for manufacturing a semiconductor device of the present invention;

DETAILED DESCRIPTION OF THE INVENTION

Figure 1:
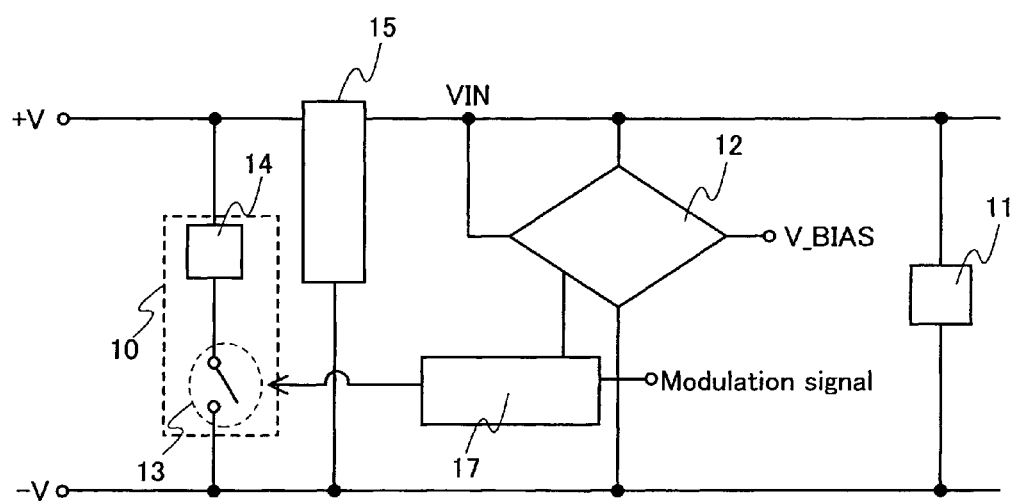
FIG. 1 is a diagram showing a structural example of a semiconductor device of the present invention.

Hereinafter, embodiment modes of the present invention will be described with reference to the accompanying drawings. Note that the present invention can be implemented in various modes, and it is easily understood by those skilled in the art that modes and details thereof can be modified in various ways without departing from the spirit and scope of the present invention. Therefore, the present invention should not be interpreted as being limited to the following description of the embodiment modes. In all the drawings used for describing the embodiment modes, the same portions or portions having similar functions are denoted by the same reference numerals, and the explanation thereof will be omitted.

(Embodiment Mode 1)

Embodiment Mode 1 of the present invention will be described with reference to FIG. 1.

A semiconductor device of the present invention includes a circuit portion 11, a rectifier circuit portion 15, a comparison circuit 12 which is a circuit for comparing input voltage VIN with reference voltage V_BIAS, a bias circuit portion 17 which applies bias voltage (protection signal) to a modulation signal, and a protection/modulation circuit portion 10 having a switch 13 and a load 14, as shown in FIG. 1. Note that the input voltage VIN is generated by the rectifier circuit portion 15.

In FIG. 1, the comparison circuit 12 outputs voltage in accordance with the input voltage VIN to the bias circuit portion 17, when the input voltage VIN reaches a given value or more. The bias circuit portion 17 applies bias voltage in accordance with the output voltage of the comparison circuit 12 to a modulation signal (adds a protection signal to the modulation signal) and outputs this modulation signal to the switch 13.

In the protection/modulation circuit portion 10 in FIG. 1, the switch 13 changes input impedance depending on the output voltage of the bias circuit portion 17.

In the protection/modulation circuit portion 10 in FIG. 1, the load 14 may be provided between the switch 13 and a −V terminal. Further, in the protection/modulation circuit portion 10, if the switch 13 itself can be used as a load, the load 14 is not required to be provided.

It is not always necessary to compare the input voltage VIN and the reference voltage V_BIAS directly. Configurations in such a case will be described with reference to FIGS. 9A and 9B.

Figure 9A:
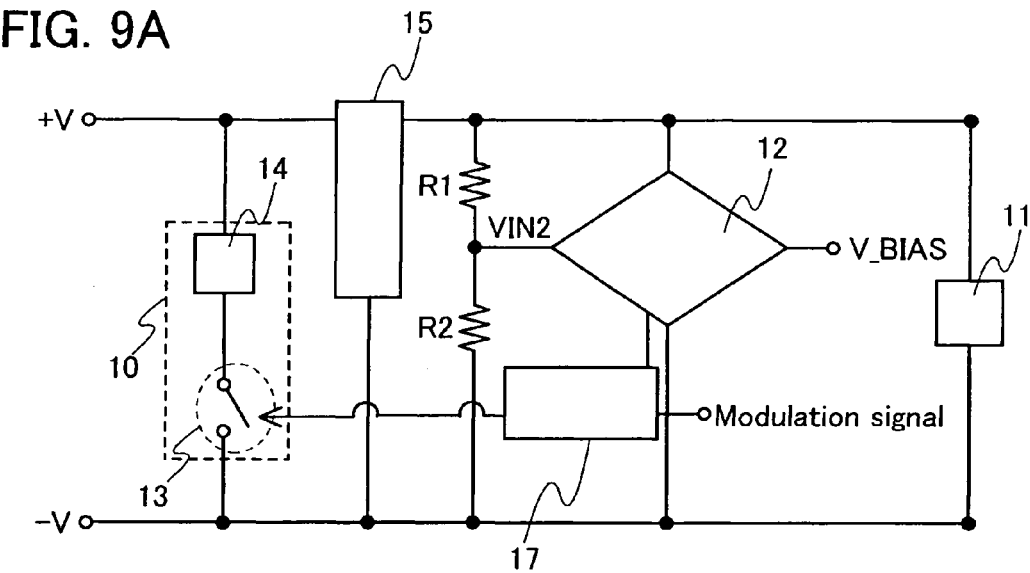
FIGS. 9A and 9B are diagrams each showing a structural example of an input circuit portion of a semiconductor device of the present invention.

As shown in FIG. 9A, in the case where the input voltage VIN is extremely high, resistors R1 and R2 are connected in series between a +V terminal and the −V terminal and a potential at a connection point of the resistors R1 and R2 is given as input voltage VIN2. A method in which the input voltage VIN2 and the reference voltage V_BIAS are compared with each other in the comparison circuit 12 may be used.

Figure 9B:
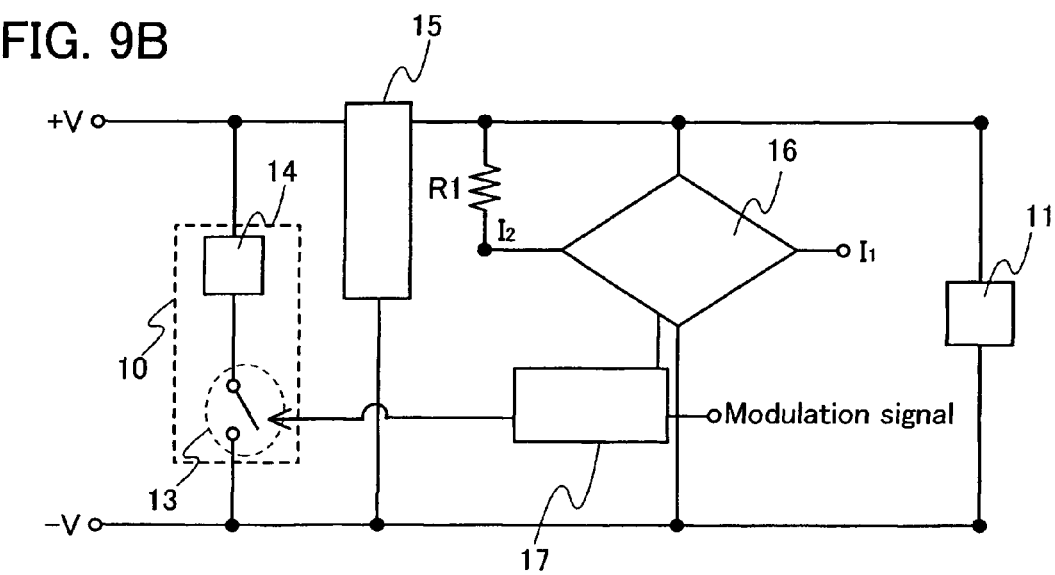

Alternatively, as shown in FIG. 9B, by providing the resistor R1 between an input terminal and the comparison circuit 12, current $I_2$ can be detected and the detected current $I_2$ and reference current $I_1$ can be compared with each other in the comparison circuit 12.

The bias circuit portion 17 in FIG. 1 outputs voltage (the protection signal) in accordance with the voltage outputted from the comparison circuit 12 also in the case where there is no modulation signal.

In FIG. 1, the terminal denoted by +V is connected to a +terminal of an antenna and the terminal denoted by −V is connected to a −terminal of the antenna. Electric power received at the antenna is transmitted to the inside of a chip, and an internal circuit of the chip is operated. The impedance of the protection/modulation circuit portion 10 when the semiconductor device does not perform protection and modulation is represented by $Z_a$. The amount of change in $Z_a$ is varied in accordance with the voltage from the bias circuit portion 17. When the amount of change in impedance necessary for modulation is represented by $\Delta Z_1$ and the amount of change in impedance necessary for protection is represented by $\Delta Z_2$, $Z_a$ in modulation is changed in the range of $Z_a$ to $(Z_a+\Delta Z_1)$; $Z_a$ in protection and modulation is changed in the range of $Z_a$ to $(Z_a+\Delta Z_1+\Delta Z_2)$; and the impedance is $Z_a+\Delta Z_2$ in the case of only protection.

Therefore, in the semiconductor device of the present invention, an operation which protects the internal circuit and an operation which sends signals to a reader/writer can be performed with one circuit. By performing these operations with one circuit, it is not necessary to increase the number of circuits connected to the antenna, in parallel with the rectifier circuit; therefore, RF electric power received at the antenna can be efficiently transmitted to the inside.

Accordingly, with the use of the present invention, in the case where a large amount of electric power is supplied to the semiconductor device, impedances of the antenna and the chip included in the semiconductor device can intentionally be made not to match each other, so that even if the antenna receives a large amount of electric power, much electric power is not transmitted to the inside of the semiconductor device. As a result, the semiconductor device can be operated normally without degrading the elements in the semiconductor device and breaking the semiconductor device.

(Embodiment Mode 2)

This embodiment mode will describe a more specific configuration of the semiconductor device shown in the preceding embodiment mode with reference to the drawings.

Figure 2:
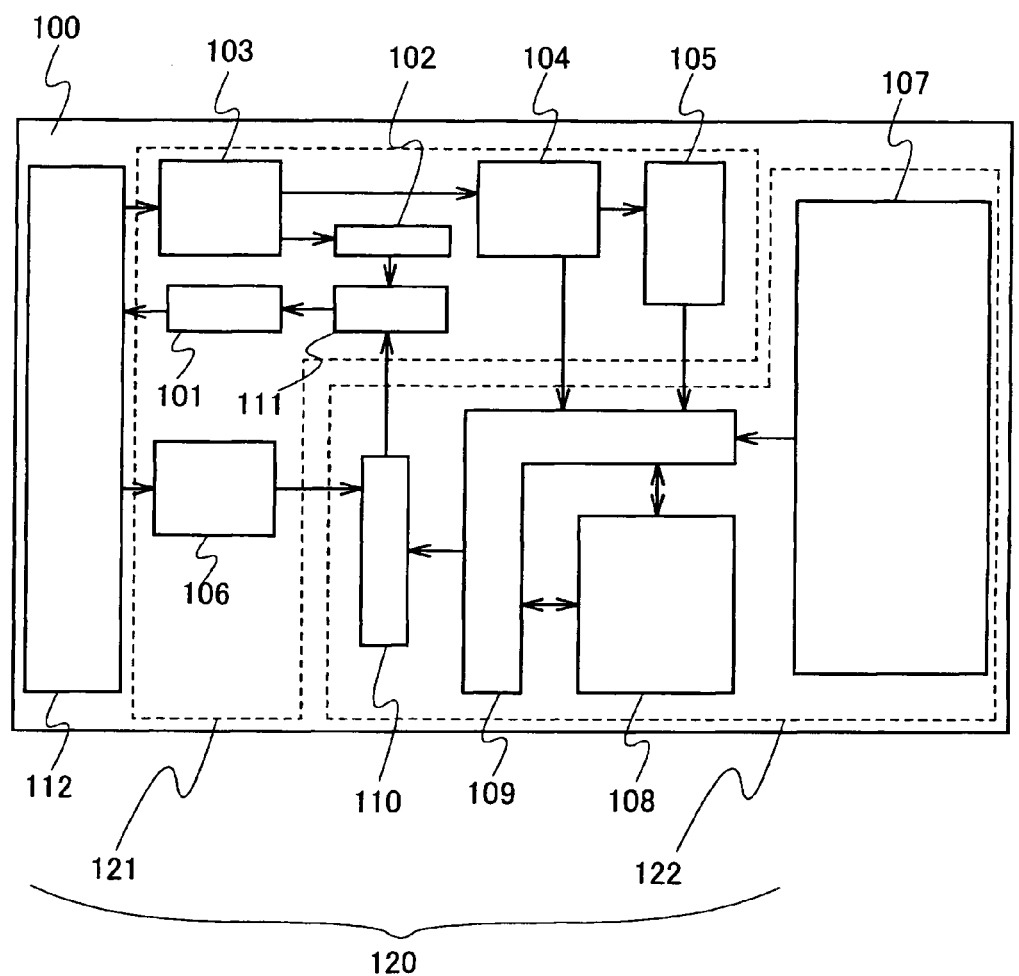
FIG. 2 is a diagram showing a structural example of a semiconductor device of the present invention.

A semiconductor device 100 shown in this embodiment mode includes an antenna 112 to receive electric power and data from a reader/writer and a chip 120 including an input circuit portion 121 and a logic circuit portion 122 (FIG. 2). Note that the antenna 112 can be manufactured separately from the chip 120 and then connected thereto in another step to form the semiconductor device. Preferably, the antenna 112 and the chip 120 are formed in the same step.

The input circuit portion 121 of the semiconductor device 100 includes a rectifier circuit portion 103 to convert AC electric power received from the antenna 112 to DC electric power, a constant voltage circuit portion 104 to supply a constant voltage to an internal circuit, a protection/modulation circuit portion 101 to perform modulation to transmit signals to the reader/writer and protection of the circuit when a too large amount of electric power is input, a protection control circuit portion 102 to control whether or not protection is performed by the protection/modulation circuit portion 101, a bias circuit portion 111 to apply bias voltage (protection signal) to a modulation signal in the case of protection, a clock generating circuit portion 105 to generate a clock signal to be supplied to the internal circuit, and a demodulation circuit portion 106 to demodulate data received from the antenna 112 into a digital signal.

The logic circuit portion 122 of the semiconductor device 100 includes an instruction analysis portion to analyze a data demodulated in the demodulation circuit portion 106, a judgment circuit portion 107 to judge whether or nor demodulated data is received normally, a memory unit 108 (hereinafter referred to as a memory), a controller circuit portion 109 to control the memory, and an encoding circuit portion 110 to encode data.

A configuration of the input circuit portion 121 of FIG. 2 will be described in detail with reference to FIG. 3.

Figure 3:
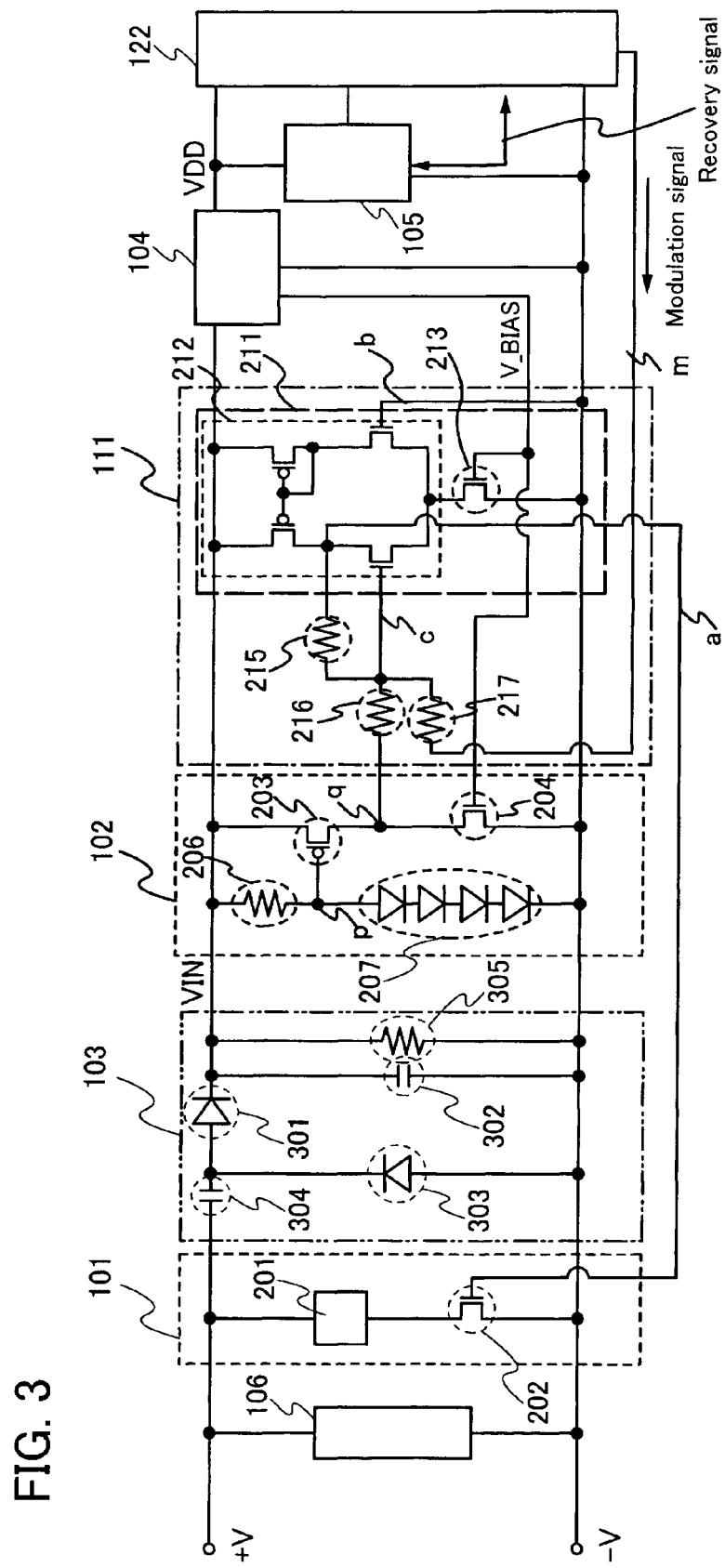
FIG. 3 is a diagram showing a structural example of an input circuit portion of a semiconductor device of the present invention.

In FIG. 3, a terminal denoted by +V is connected to a +terminal of the antenna 112 and a terminal denoted by −V is connected to a −terminal of the antenna 112. The demodulation circuit portion 106 demodulates a data signal included in a radiowave inputted from the +V terminal. The rectifier circuit portion 103 converts AC power supply voltage inputted from the +V terminal and the −V terminal to DC power supply voltage VIN. The constant voltage circuit portion 104 is connected to the +V terminal and the −V terminal. The voltage VIN converted in the rectifier circuit portion 103 is inputted to the constant voltage circuit portion 104, and the constant voltage circuit portion 104 outputs power supply voltage VDD and reference voltage V_BIAS which are made constant. A VDD terminal is connected to the clock generating circuit portion 105 and the logic circuit portion 122, and supplies power supply voltage to each circuit. A V_BIAS terminal is connected to the protection control circuit portion 102, and reference voltage for determining potential of a node q is obtained. The power supply voltage VDD is inputted to the clock generating circuit portion 105 which is connected to the +V terminal and the −V terminal, and the clock generating circuit portion 105 outputs a reference clock signal. An output terminal of the clock generating circuit portion 105 is connected to the logic circuit portion 122 so that the clock signal is supplied to each circuit in the logic circuit portion 122.

The rectifier circuit portion 103 includes a diode 301 to convert (rectify) AC power supply voltage that is inputted when voltage of the +V terminal is higher than that of the −V terminal to DC power supply voltage and charge a capacitor 302; a diode 303 to charge a capacitor 304 with electric charge when voltage of the −V terminal is higher than that of the +V terminal; the capacitor 302 to store the DC power supply voltage rectified at the diode 301, and the capacitor 304 to detect a radiowave inputted from the +V terminal and store the electric charge rectified at the diode 303. Note that the semiconductor device is preferably provided with a resistor 305 to release electric charge accumulated in the chip 120 at the time of reset (non-operating state).

An output terminal of the diode 301 is connected to the capacitor 302, and an input terminal thereof is connected to the capacitor 304. One terminal of the capacitor 302 is connected to the diode 301 and the other terminal thereof is connected to the −V terminal. An output terminal of the diode 303 is connected to the capacitor 304, and an input terminal thereof is connected to the −V terminal. One terminal of the capacitor 304 is connected to the +V terminal and the other terminal thereof is connected to the diode 303.

Further, in the semiconductor device, when the resistor 305 to release electric charge accumulated in the chip 120 at the time of reset (non-operating state) is provided, one terminal of the resistor 305 is connected to a VIN terminal and the other terminal thereof is connected to the −V terminal.

Further, although the case where a circuit configuration called a half-wave voltage-doubler rectifier circuit is used for the rectifier circuit portion 103 is described in this embodiment mode, the present invention is not limited thereto and a voltage n-multiplier rectifier circuit such as a half-wave voltage-quadrupler rectifier circuit or a half-wave voltage-sextupler rectifier circuit, a full-wave rectifier circuit, or the like may also be used.

The protection/modulation circuit portion 101, the protection control circuit portion 102, and the bias circuit portion 111 shown in FIG. 3 will be described in detail below.

The protection control circuit portion 102 includes a transistor 204 which is driven by the reference voltage (V_BIAS) generated in the constant voltage circuit portion 104, a diode 207 to determine potential of a node p, a resistor 206, and a transistor 203 to receive a change in potential of the node p and change the potential of the node q.

One terminal of the resistor 206 is connected to the VIN terminal and the other terminal thereof is connected to the diode 207 in series. One terminal of the diode 207 is connected to the resistor 206 and the other terminal thereof is connected to the −V terminal. In FIG. 3, a connection point between the resistor 206 and the diode 207 is referred to as the node p. A gate electrode of the transistor 203 is connected to the node p, a source electrode thereof is connected to the +V terminal, and a drain electrode thereof is connected to the transistor 204. A gate electrode of the transistor 204 is connected to reference voltage (V_BIAS) output terminal of the constant voltage circuit portion 104, a source electrode thereof is connected to the −V terminal, and a drain electrode thereof is connected to the transistor 203. In FIG. 3, a connection point between the transistor 204 and the transistor 203 is referred to as the node q.

In FIG. 3, the example in which four diodes are connected in series as the diode 207 is described; however, the number of diodes is not limited to this as long as the potential of the node p can be kept to the potential which does not turn on the transistor 203 at the time of a usual operation (in which protection is not desired to be performed by the protection/modulation circuit portion 101).

Note that as each of the diodes 207, 301, and 303, a diode element is not necessarily used, and a MOS transistor with gate and drain electrodes electrically connected to each other may be used.

The protection/modulation circuit portion 101 includes a transistor 202 to determine whether or not to supply current to a load 201, and the load 201 to change the input impedance of the chip 120 when current is supplied to the transistor 202.

The load 201 controls the amount of change in input impedance of the chip 120 depending on output of the bias circuit portion 111 (the potential of a node a). For example, the load 201 is formed using a capacitor, a resistor, an inductor, or the like.

In FIG. 3, when the communication distance is appropriate and the semiconductor device operates normally, the voltage (V_BIAS) applied to the gate electrode of the transistor 204 is constant due to the function of the constant voltage circuit portion 104, so that the transistor 204 functions as a constant current source.

Further, when the potential of the node p is lower than the threshold voltage of the diode 207, the transistor 203 is turned off and the potential of the node q is kept to the potential which is higher than the potential of the −V terminal by the threshold voltage of the transistor 204.

When a large amount of electric power is supplied to the semiconductor device, current flows through the diode 207 when the potential of the node p becomes higher than the threshold voltage of the diode 207, so that the potential of the node p is decreased. In accordance with this, the transistor 203 is turned on, and the potential of the node q is increased.

The bias circuit portion 111 forms a voltage addition unit using a differential amplifier circuit 211, a resistor 215, a resistor 216, and a resistor 217. A node b of the differential amplifier circuit 211 serves as a −terminal of an operational amplifier, a node c serves as a +terminal of the operational amplifier, and the node a serves as an output terminal of the operational amplifier. The differential amplifier circuit 211 includes a differential circuit 212 and a transistor 213. The resistor 215 is connected between the node a of the differential amplifier circuit 211 and the node c of the differential amplifier circuit 211. The resistor 216 is connected between the node q of the protection control circuit portion 102 and the node c of the differential amplifier circuit 211. The resistor 217 is connected between a node m to which a modulation signal is output from the logic circuit portion 122 and the node c of the differential amplifier circuit 211.

The bias circuit portion 111 operates as a voltage addition unit using the operational amplifier. A voltage of the node that is an output of the bias circuit portion 111 is determined by resistance of the resistors 215, 216, and 217 and voltage applied thereto. Resistance of the resistors 215, 216, and 217 are set to be $R_1$, $R_2$, and $R_3$, respectively, and voltages at the node a, the node q, and the node m are set to be $V_a$, $V_q$, and $V_m$, respectively, and the voltage $V_a$ of the node a is obtained by $V_a = -((R_1/R_2) \times V_q + (R_1/R_3) \times V_m)$. As in the equation, the voltage $V_a$ is obtained by adding the product of $V_q$ and a resistance ratio and the product of $V_m$ and a resistance ratio. The amount of change in $V_a$ when $V_q$ reaches a given voltage is denoted by $\Delta V_1$ and the amount of change in $V_a$ when $V_m$ reaches a given voltage is denoted by $\Delta V_2$ to explain the change in voltage of the node a in protection and modulation.

Figure 19A:
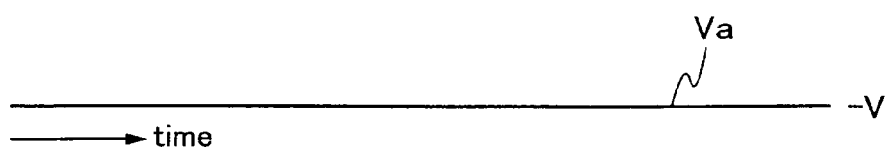
FIGS. 19A to 19C are diagrams showing examples of operations of a semiconductor device of the present invention.
Figure 19B:
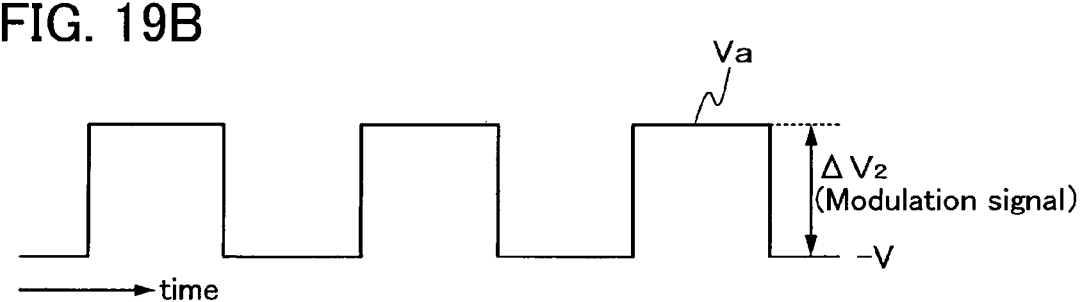

When a tag and a reader/writer have a certain distance therebetween and the protection control circuit portion 102 does not perform protection, the voltage $V_a$ at the node a of the bias circuit portion 111 as well as $V_q$ and $V_m$ is 0, so that a potential almost equal to that of the −V terminal is outputted (FIG. 19A). Since $V_m$ is changed when a modulation signal is inputted, $V_a$ is changed with time in accordance with the modulation signal by amplitude of $\Delta V_2$ (FIG. 19B).

Figure 19C:
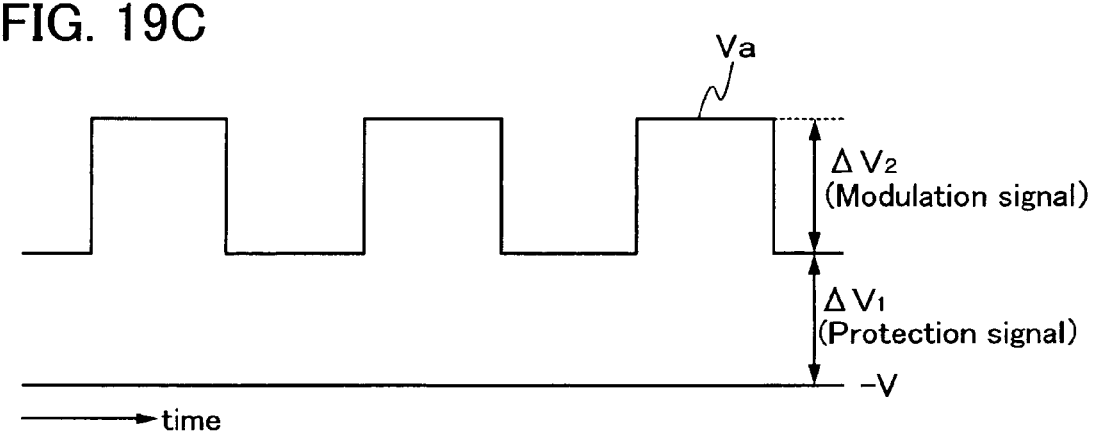

Next, when the tag and the reader/writer are extremely close to each other and the protection control circuit portion 102 performs protection, a protection signal is inputted and the voltage $V_a$ is changed by $\Delta V_1$. When the modulation signal is inputted in this condition, $V_a$ is switched with time in accordance with the modulation signal based on the voltage of $\Delta V_1$, that is, between the voltage $\Delta V_1$ and the voltage obtained by adding $\Delta V_1$ and $\Delta V_2$ (FIG. 19C).

In the bias circuit portion 111, the reference potential (V_BIAS) outputted from the constant voltage circuit portion 104 is inputted to the constant current transistor 213, but potential is not limited to this as long as it is stable to some extent.

The amount of current supplied to the load 201 has relation to voltage applied to the gate electrode of the transistor 202. When the amount of current supplied to the load 201 is changed, the input impedance of the chip 120 is also changed. That is, through the control of voltage applied to the gate electrode of the transistor 202, the input impedance of the chip 120 can be controlled.

To change the input impedance of the chip 120 means that the impedances of the antenna 112 and the chip 120 can be made not to match each other. When the impedances do not match each other, part of electric power received at the antenna 112 is reflected. This part of electric power reflected reaches the reader/writer. When the electric power reflected is changed with time, the reader/writer recognizes that the semiconductor device responds.

Therefore, $V_a$ in the case where there is no demodulation signal and only protection is performed is not changed with time, and thus, the reader/writer does not recognizes that the tag responds. Further, voltage of the demodulation signal is changed with time in modulation; therefore, the reader/writer recognizes that the tag responds. This also applies to the case where protection and modulation are performed at the same time.

As described above, with the use of the present invention, the impedances of the antenna and the chip included in the semiconductor device can intentionally be made not to match each other. Further, protection and modulation can be performed with one circuit. Accordingly, a wide communication range can be secured without degrading the elements in the semiconductor device or breaking the semiconductor device.

(Embodiment Mode 3)

The semiconductor device of the present invention can also have a configuration without the load 201 of FIG. 3, as a variation of the input circuit portion according to Embodiment Mode 2.

The impedance of the chip 120 can be controlled by voltage applied to the gate electrode of the transistor 202, also when the load 201 is not provided. The amount of current to be applied to the transistor 202 can be estimated by the intended degree of change in impedance of the chip 120. Therefore, the size of the transistor 202 may be determined to be able to supply current in such amount that the impedance of the chip 120 is sufficiently changed.

Thus, also when the load 201 is not provided, the impedance of the chip 120 can be changed by applying current to the transistor 202, whereby the impedances of the chip 120 and the antenna 112 can intentionally be made not to match each other.

This embodiment mode can be implemented in combination with technical elements in other embodiment modes in this specification. That is, with the use of the present invention, the impedances of the antenna and the chip included in the semiconductor device can intentionally be made not to match each other. Further, protection and modulation can be performed with one circuit, whereby a wide communication range can be secured without degrading the elements in the semiconductor device and breaking the semiconductor device.

(Embodiment Mode 4)

Figure 4:
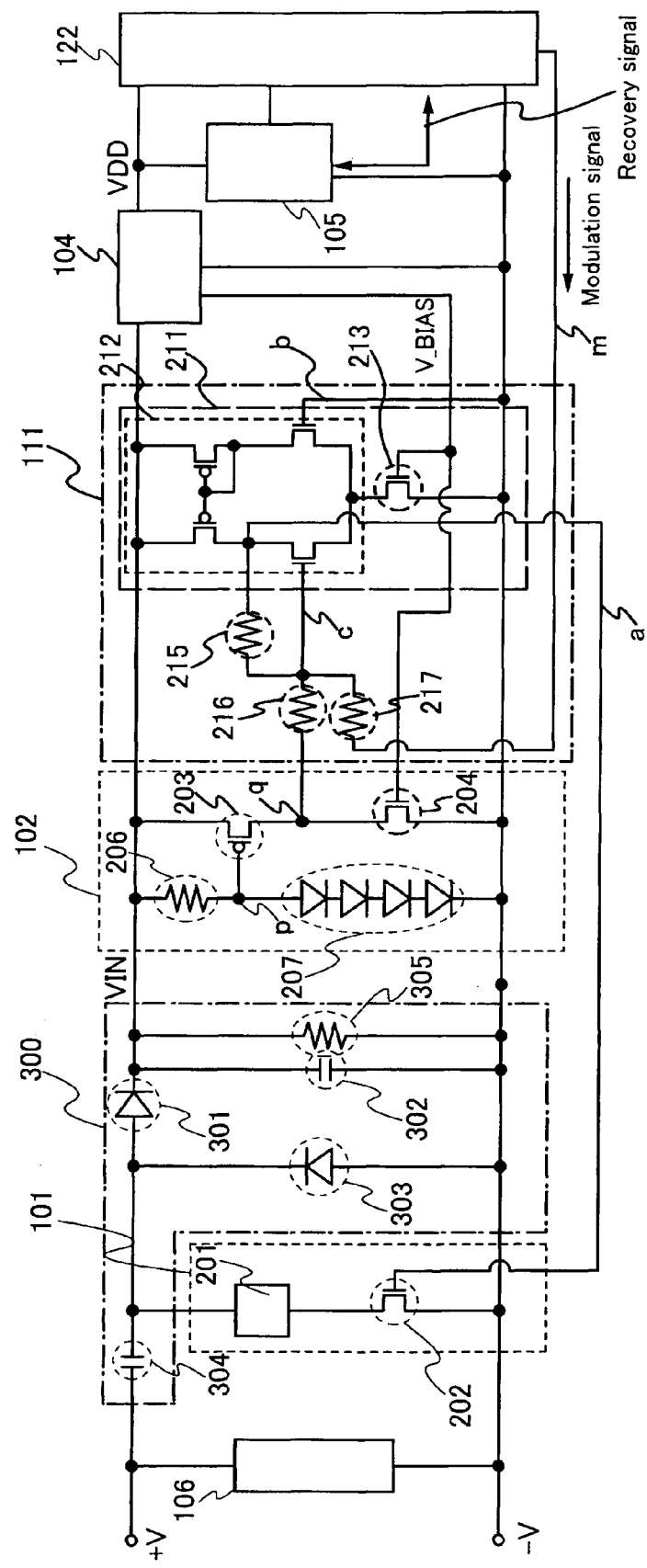
FIG. 4 is a diagram showing a structural example of an input circuit portion of a semiconductor device of the present invention.

This embodiment mode will describe a configuration in which a protection circuit portion is provided between a capacitor 304 and a diode 301 of a rectifier circuit portion 300, with reference to FIG. 4, as another variation of the input circuit portion according to Embodiment Mode 2.

In FIG. 4, a terminal denoted by +V is connected to a +terminal of the antenna 112 and a terminal denoted by −V is connected to a −terminal of the antenna 112. A protection/modulation circuit portion 101 is connected between the capacitor 304 and the diode 301 of the rectifier circuit portion 300. A demodulation circuit portion 106 demodulates a data signal included in a radiowave input from the +V terminal. A terminal of voltage VIN which is obtained by rectification in the rectifier circuit portion 300 and the −V terminal are connected to a constant voltage circuit portion 104, and the constant voltage circuit portion 104 outputs power supply voltage VDD and reference voltage V_BIAS which are made constant. A VDD terminal is connected to a clock generating circuit portion 105 and a logic circuit portion 122, and supplies power supply voltage to each circuit. A V_BIAS terminal is connected to a protection control circuit portion 102, and reference voltage for determining potential of a node q is obtained. The power supply voltage VDD and the voltage of the −V terminal are inputted to the clock generating circuit portion 105 and the clock generating circuit portion 105 outputs a reference clock signal. An output terminal of the clock generating circuit portion 105 is connected to the logic circuit portion 122 so that a clock signal is supplied to each circuit in the logic circuit portion 122.

The rectifier circuit portion 300 includes the diode 301 to convert (rectify) AC power supply voltage that is input when the voltage of the +V terminal is higher than that of the −V terminal to DC power supply voltage and charge a capacitor 302; a diode 303 to charge the capacitor 304 with electric charge when the voltage of the −V terminal is higher than that of the +V terminal; the capacitor 302 to store the DC power supply voltage rectified in the diode 301; and the capacitor 304 to detect a radiowave inputted from the +V terminal and store the electric charge rectified in the diode 303. Note that the semiconductor device is preferably provided with a resistor 305 to release electric charge accumulated in the chip 120 at the time of reset (non-operating state).

Also in this embodiment mode, by the control of voltage applied to a gate electrode of a transistor 202, the amount of current applied to a load 201 can be changed and the input impedance of the chip 120 can be changed, so that protection and modulation can be performed.

This embodiment mode can be implemented in combination with technical elements in other embodiment modes in this specification. That is, with the use of the present invention, the impedances of the antenna and the chip included in the semiconductor device can intentionally be made not to match each other. Further, protection and modulation can be performed with one circuit, whereby a wide communication range can be secured without degrading the elements in the semiconductor device and breaking the semiconductor device.

(Embodiment Mode 5)

The semiconductor device of the present invention can also have a configuration in which the load 201 of FIG. 4 is not provided, as a variation of the input circuit portion according to Embodiment Mode 2.

The impedance of the chip 120 can be controlled by a voltage applied to the gate electrode of the transistor 202, also when the load 201 is not provided. The amount of current to be applied to the transistor 202 can be estimated by the intended degree of change in impedance of the chip 120. Therefore, the size of the transistor 202 may be determined to be able to supply current in such amount that the impedance of the chip 120 is sufficiently changed.

Thus, also when the load 201 is not provided, the impedance of the chip 120 can be changed by applying current to the transistor 202, whereby the impedances of the chip 120 and the antenna 112 can intentionally be made not to match each other.

This embodiment mode can be implemented in combination with technical elements in other embodiment modes in this specification. That is, with the use of the present invention, the impedances of the antenna and the chip included in the semiconductor device can intentionally be made not to match each other. Further, protection and modulation can be performed with one circuit, whereby a wide communication range can be secured without degrading the elements in the semiconductor device and breaking the semiconductor device.

(Embodiment Mode 6)

Figure 5:
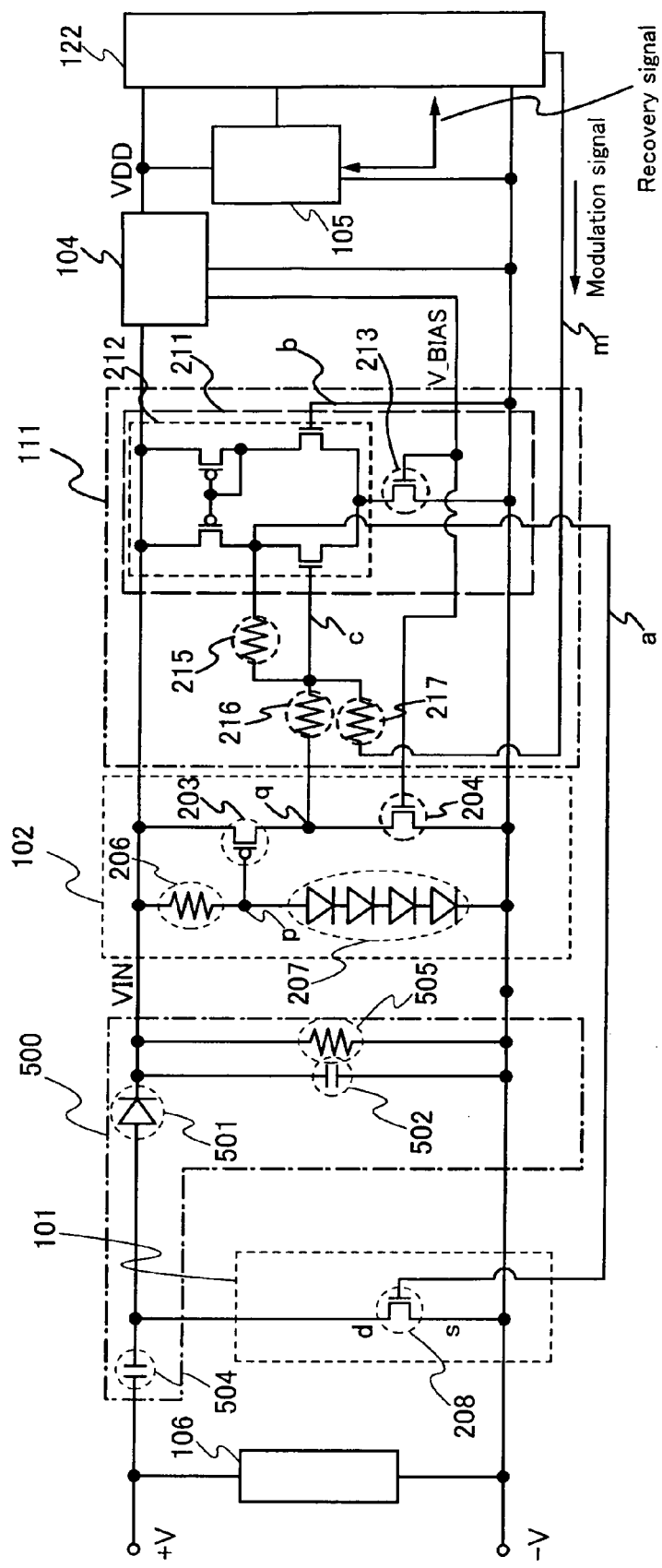
FIG. 5 is a diagram showing a structural example of an input circuit portion of a semiconductor device of the present invention.

This embodiment mode will describe a configuration in which a protection/modulation circuit is provided instead of the rectifier diode 303, with reference to FIG. 5 as another variation of the input circuit portion according to Embodiment Mode 2.

A protection/modulation circuit portion 101 shown in this embodiment mode also has a function of the diode 303 in Embodiment Mode 5. Hereinafter, a rectifier circuit portion 500 and the protection/modulation circuit portion 101 shown in FIG. 5 will be described in detail.

The rectifier circuit portion 500 includes a diode 501 to convert (rectify) AC power supply voltage that is inputted when voltage of the +V terminal is higher than that of the −V terminal to DC power supply voltage and charge a capacitor 502; the capacitor 502 to store the DC power supply voltage rectified in the diode 501; and a capacitor 504. The protection/modulation circuit portion 101 is connected between the capacitor 504 and the diode 501. Note that the semiconductor device is preferably provided with a resistor 505 to release electric charge accumulated in the chip 120 at the time of reset (non-operating state).

The following will describe the case where a tag and a reader/writer have a certain distance therebetween and a protection control circuit portion 102 does not perform protection. Note that in a transistor 208 in the protection/modulation circuit portion 101, an electrode connected to the −V terminal is denoted by s, and an electrode connected to one terminal of the capacitor 504 in the rectifier circuit portion 500 is denoted by d. When a modulation signal is not inputted to a bias circuit portion 111, voltage close to potential of the −V terminal is inputted to a gate electrode of the transistor 208. At this time, current flows from s to d when the voltage of the −V terminal is higher than that of the +V terminal, and thus, the transistor 208 functions similarly to the diode 303 and charges the capacitor 502 with electric charge. When a modulation signal is inputted to the bias circuit portion 111, a voltage in accordance with the modulation signal is inputted to the gate electrode of the transistor 208. In the transistor 208, the current flows also from d to s, and the input impedance of the chip is changed in accordance with the modulation signal.

Next, the following will describe the case where the reader/writer is extremely close to the tag and the protection control circuit portion 102 performs protection. When a modulation signal is not inputted to the bias circuit portion 111, voltage for protection is inputted to the gate electrode of the transistor 208 and current flows also from d to s in the transistor 208, so that less current is supplied to the diode 501 of the rectifier circuit portion 500. When a modulation signal is inputted to the bias circuit portion 111, voltage in accordance with protection and modulation is outputted to the gate electrode of the transistor 208 from the bias circuit portion 111, and the amount of current which flows from d to s in the transistor 208 is changed in accordance with the modulation signal, so that the input impedance of the chip is changed in accordance with the modulation signal.

Note that as the diode 501, a diode element is not necessarily used, and a MOS transistor with gate and drain electrodes electrically connected to each other may be used.

Therefore, in this embodiment mode, the number of elements connected to the antenna terminal +V in parallel can be reduced while maintaining protection and modulation of Embodiment Mode 2, and power conversion efficiency of the chip can be improved.

This embodiment mode can be implemented in combination with technical elements in other embodiment modes in this specification. That is, with the use of the present invention, the impedances of the antenna and the chip included in the semiconductor device can intentionally be made not to match each other. Further, protection and modulation can be performed with one circuit, whereby a wide communication range can be secured without degrading the elements in the semiconductor device and breaking the semiconductor device.

(Embodiment Mode 7)

Figure 6:
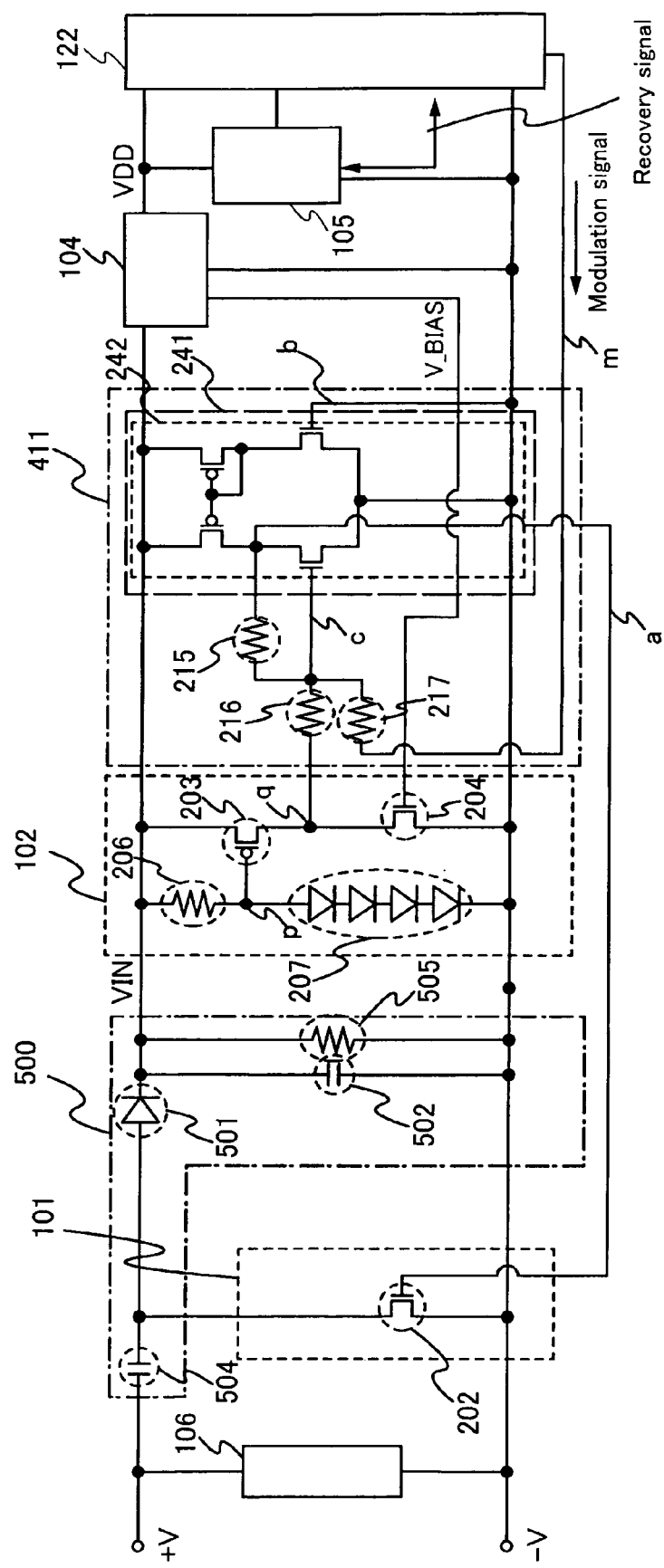
FIG. 6 is a diagram showing a structural example of an input circuit portion of a semiconductor device of the present invention.

This embodiment mode will describe a configuration in which the transistor 213 of the differential amplifier circuit 211 is not provided, with reference to FIG. 6 as a variation of the bias circuit portion 111 according to Embodiment Mode 2.

A differential amplifier circuit 241 shown in this embodiment mode is constituted by a differential circuit 242. A node b of the differential amplifier circuit 241 serves as a −terminal of an operational amplifier, a node c serves as a +terminal of the operational amplifier, and a node a serves as an output terminal of the operational amplifier.

A bias circuit portion 411 forms a voltage addition unit using the differential amplifier circuit 241, a resistor 215, a resistor 216, and a resistor 217. The node b of the differential amplifier circuit 241 serves as the −terminal of the operational amplifier, the node c serves as the +terminal of the operational amplifier, and the node a serves as the output terminal of the operational amplifier. The resistor 215 is connected among the node a of the differential amplifier circuit 241, a node q of a protection control circuit portion 102, and the node c of the differential amplifier circuit 241. The resistor 216 is connected between the node q of the protection control circuit portion 102 and the node c of the differential amplifier circuit 241. The resistor 217 is connected between a line to which a modulation signal is output from a logic circuit and the node c of the differential amplifier circuit 241.

Next, an operation of the bias circuit portion 411 of this embodiment mode will be described. The bias circuit portion 411 operates in the same way as the bias circuit portion 111 of Embodiment Mode 2. Voltage of the node a that is the output of the bias circuit portion 411 is determined by resistance of the resistors 215, 216, and 217 and voltage applied thereto. Resistance of the resistors 215, 216, and 217 are set to be $R_1$, $R_2$, and $R_3$, respectively, and voltages at the node a, the node q, and the node m are set to be $V_a$, $V_q$, and $V_m$, respectively, and the voltage $V_a$ of the node a is obtained by $V_a = -((R_1/R_2) \times V_q + (R_1/R_3) \times V_m)$. As in the equation, the voltage $V_a$ is obtained by adding the product of $V_q$ and a resistance ratio and the product of $V_m$ and a resistance ratio. The amount of change in $V_a$ when $V_q$ reaches a given voltage is denoted by $\Delta V_1$ and the amount of change in $V_a$ when $V_m$ reaches a given voltage is denoted by $\Delta V_2$ to explain the change in voltage of the node a in protection and modulation.

When a tag and a reader/writer have a certain distance therebetween and the protection control circuit portion 102 does not perform protection, the voltage $V_a$ at the node a of the bias circuit portion 411 as well as $V_q$ and $V_m$ is 0, so that potential almost equal to that of the −V terminal is output. Since $V_m$ is changed when a modulation signal is input, $V_a$ is changed with time in accordance with the modulation signal by amplitude of $\Delta V_2$.

Next, when the reader/writer is extremely close to the tag and the protection control circuit portion 102 performs protection, $V_a$ is changed by $\Delta V_1$. When a modulation signal is inputted in this condition, $V_a$ is switched with time in accordance with the modulation signal based on the voltage of $\Delta V_1$, that is, between the voltage $\Delta V_1$ and the voltage obtained by adding $\Delta V_1$ and $\Delta V_2$.

Although this embodiment mode describes a variation of the differential circuit, the configuration of the differential circuit is not limited thereto as long as the bias circuit portion operates as a voltage addition unit.

This embodiment mode can be implemented in combination with technical elements in other embodiment modes in this specification. That is, with the use of the present invention, the impedances of the antenna and the chip included in the semiconductor device can intentionally be made not to match each other. Further, protection and modulation can be performed with one circuit, whereby a wide communication range can be secured without degrading the elements in the semiconductor device and breaking the semiconductor device.

(Embodiment Mode 8)

A configuration of a semiconductor device shown in this embodiment mode will be described with reference to FIG. 8.

Figure 8:
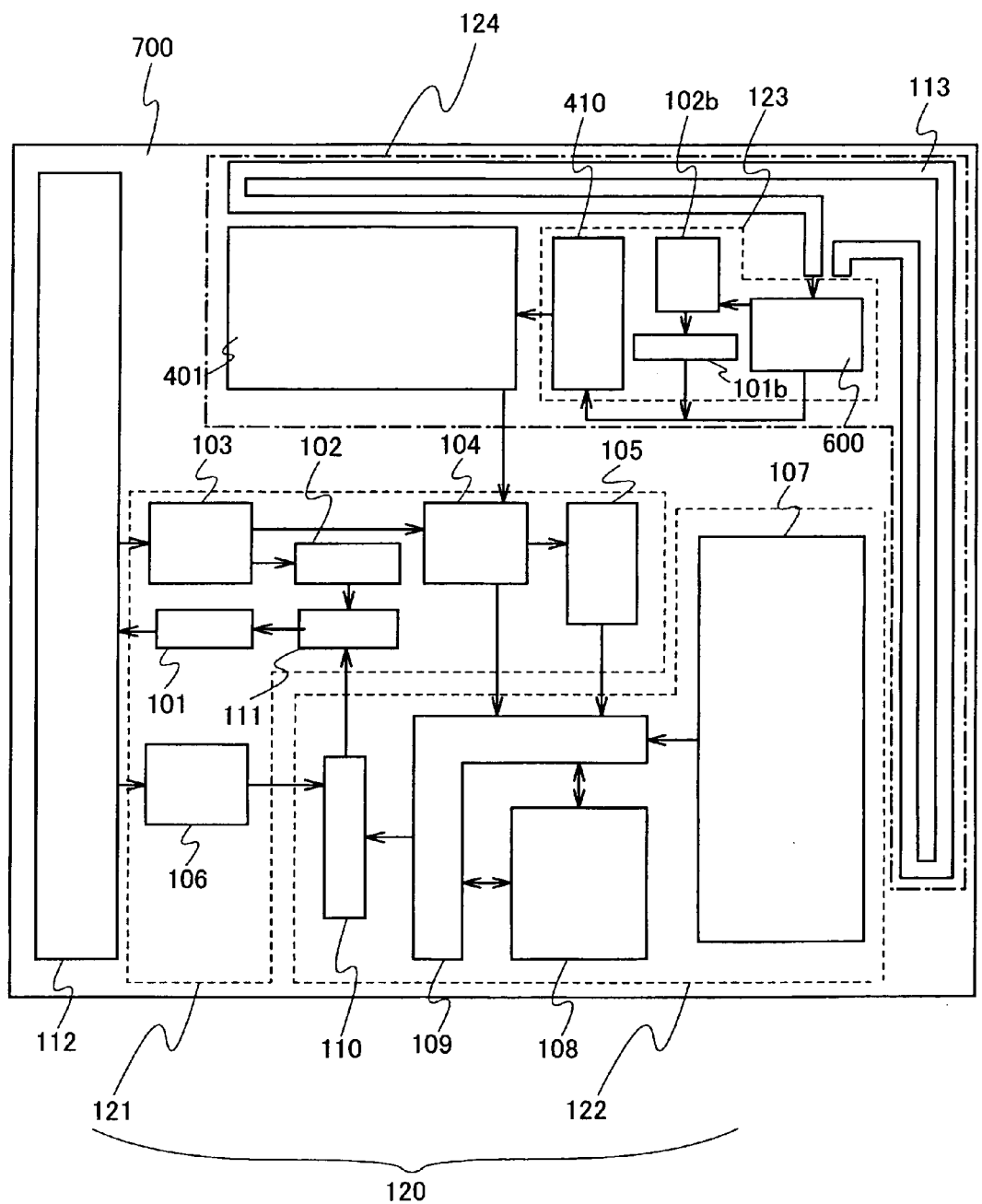
FIG. 8 is a diagram showing a structural example of a semiconductor device of the present invention.

FIG. 8 shows the semiconductor device of FIG. 2 provided with a battery function. A battery function in this specification means that continuous operating time can be restored by charging.

A semiconductor device 700 shown in this embodiment mode is obtained by connecting a charging battery portion 124 to the semiconductor device of FIG. 2. The charging battery portion 124 includes a battery 401, an antenna 113 to receive electric power for charging, and a charging circuit portion 123 to store electric power received at the antenna. The charging battery portion 124 is connected to a constant voltage circuit portion 104 of a chip 120.

Figure 7:
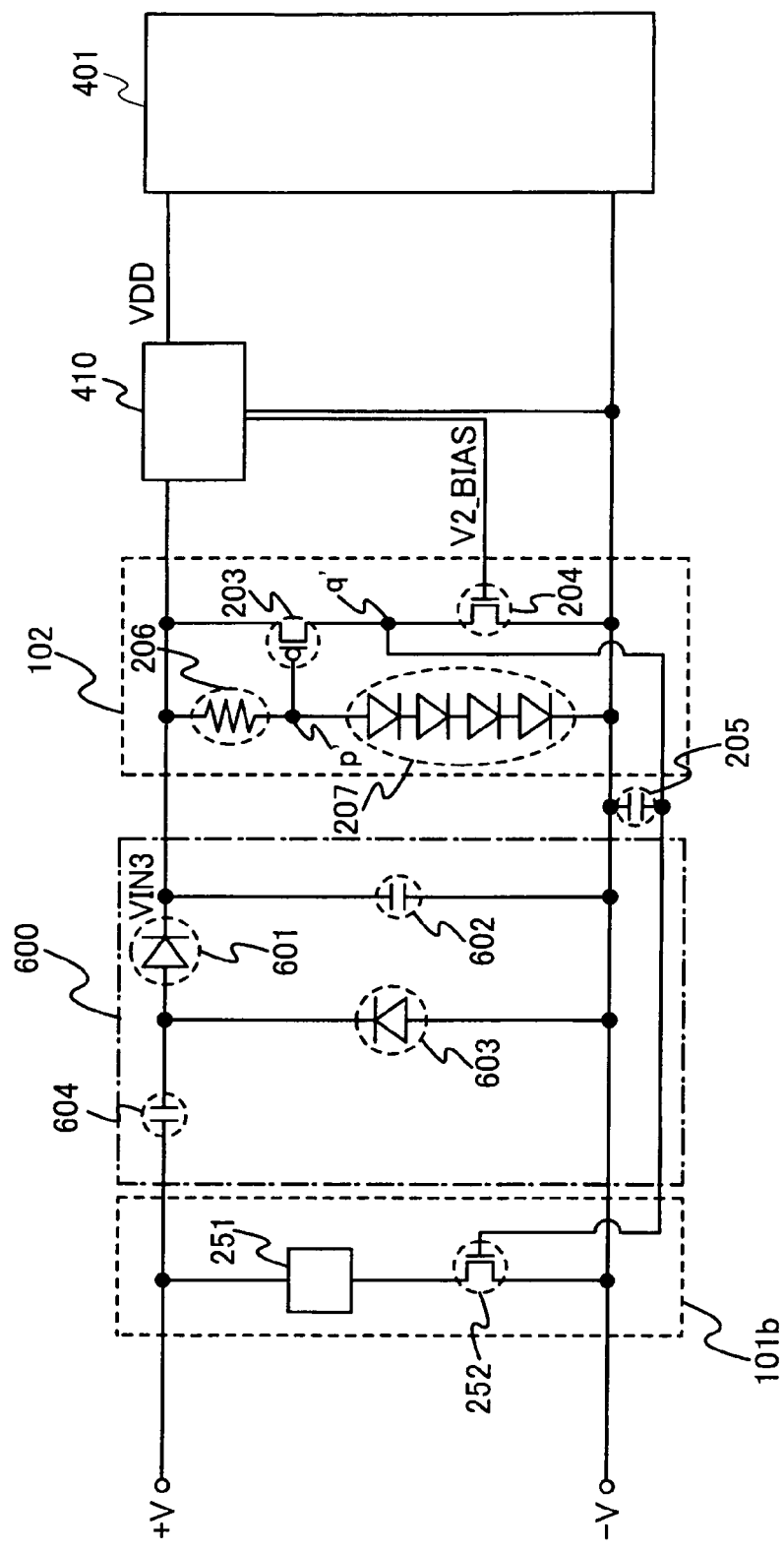
FIG. 7 is a diagram showing a structural example of a charging circuit portion of a semiconductor device of the present invention.

The charging circuit portion 123 in this embodiment mode will be described with reference to FIG. 7.

In addition, an input circuit portion 121 in this embodiment mode can employ any of the configurations shown in Embodiment Modes 1 to 7.

The charging circuit portion 123 includes a charging mechanism control circuit portion 410 to monitor the battery 401 and power supply voltage rectified in a rectifier circuit portion 600 and control charging conditions of the battery 401; the rectifier circuit portion 600 to convert AC electric power received from the antenna 113 to DC electric power; a charging protection circuit portion 101b to protect an internal circuit when electric power received from the antenna 113 is excessive; and a charging protection circuit control circuit portion 102b (also referred to as a charging comparison circuit) to control whether or not to operate the charging protection circuit portion 101b.

The rectifier circuit portion 600 includes a diode 601 to convert (rectify) AC power supply voltage that is input when the voltage of the +V terminal is higher than that of the −V terminal to DC power supply voltage and charge a capacitor 602; a diode 603 to charge a capacitor 604 with electric charge when the voltage of the −V terminal is higher than that of the +V terminal; the capacitor 602 to store the DC power supply voltage rectified in the diode 601; and the capacitor 604 to detect a radiowave inputted from the +V terminal and store the electric charge rectified in the diode 603.

An output terminal of the diode 601 is connected to the capacitor 602, and an input terminal thereof is connected to the capacitor 604. One terminal of the capacitor 602 is connected to the diode 601 and the other terminal thereof is connected to the −V terminal. An output terminal of the diode 603 is connected to the capacitor 604, and an input terminal thereof is connected to the −V terminal. One terminal of the capacitor 604 is connected to the +V terminal and the other terminal thereof is connected to the diode 603.

Further, although the case where a circuit configuration called a half-wave voltage-doubler rectifier circuit is used for the rectifier circuit portion 600 is described in this embodiment mode, the present invention is not limited thereto and a voltage n-multiplier rectifier circuit such as a half-wave voltage-quadrupler rectifier circuit or a half-wave voltage-sextupler rectifier circuit, a full-wave rectifier circuit, or the like may also be used.

The charging protection circuit control circuit portion 102b includes a transistor 204 which is driven by reference voltage (V2_BIAS) generated in the charging mechanism control circuit portion 410, a phase compensation capacitor 205, a diode 207 to determine potential of a node p', a resistor 206, and a transistor 203 to receive a change in potential of the node p' and change potential of a node q'.

The charging protection circuit portion 101b includes a transistor 252 to determine whether or not to supply current to a load 251, and the load 251 to change the input impedance of the charging battery portion 124, to which current is supplied when the transistor 252 is turned on.

The load 251 controls the amount of change in input impedance of the charging battery portion 124 depending on output of the charging protection circuit control circuit portion 102b (the potential of the node q). For example, the load 251 is formed using a capacitor, a resistor, an inductor, or the like.

Note that, as a battery, for example, a lithium battery, and more preferably, a battery formed into a sheet shape such as a lithium polymer battery using a gel-like electrolyte, a lithium ion battery, or the like is used. By using the sheet-shape battery, the semiconductor device can be reduced in size (thickness). Note that any battery can be used as long as the battery can be charged, and a battery capable of charging and discharging such as a nickel-metal-hydride battery or a nickel-cadmium battery, or a capacitor having high capacity or the like may be used as well. As a high-capacity capacitor, it is preferable to use a capacitor having electrodes whose opposed areas are large. In particular, it is preferable to use an electric double layer capacitor which is formed from an electrode material having a large specific surface area such as activated carbon, fullerene, or a carbon nanotube. A capacitor has a simpler structure than a battery. Further, a capacitor can be easily formed to be thin and formed by stacking layers. An electric double layer capacitor has a function of storing electric power and will not deteriorate much even after it is charged and discharged a number of times. Further, the electric double layer capacitor has an excellent property in that it can be charged rapidly.

When a communication distance is extremely short and a large amount of electric power is supplied to the semiconductor device, in the charging protection circuit control circuit portion 102b, current flows through the diode 207 when potential at the node p becomes higher than the threshold voltage of the diode 207, and thus, potential at the node p' is decreased. Accordingly, the transistor 203 is turned on.

The charging protection circuit portion 101b includes the same elements as the protection/modulation circuit portion 101 of the preceding embodiment modes but performs only protection in this embodiment mode. When the transistor 203 is turned on and current is supplied to the node q', the potential at the node q' is increased. When the potential at the node q' is increased, the transistor 252 is turned on, and current is supplied to the load 251. When the current is supplied to the load 251, the input impedance of the charging battery portion 124 is changed, whereby the element can be prevented from being deteriorated and broken.

When current is supplied to the load 251, the input impedance of the charging battery portion 124 is changed.

To change the input impedance of the charging battery portion 124 means that the impedances of the antennas 112 and 113 and the charging battery portion 124 are made not to match each other. In other words, a reflection coefficient is increased.

In general, electric-power reflection occurs when output impedance on the side of supplying electric power and input impedance on the side of receiving electric power do not match each other, and the transmission efficiency of electric power is decreased. That is, in order to efficiently transmit electric power received at the antennas 112 and 113 to the chip 120 and the charging battery portion 124, impedance matching between the antennas 112 and 113 and the charging battery portion 124 is necessary.

The above-described property is used in this embodiment mode, too. When the communication distance is extremely short and a large amount of electric power is supplied to the semiconductor device, current is supplied to the load 251 to change the impedance of the charging battery portion 124, so that the impedances of the charging battery portion 124 and the antenna 113 are intentionally made not to match each other. Accordingly, a large amount of electric power which may be received from the antenna 113 is not transmitted to the charging battery portion 124 so much, and therefore, the semiconductor device can be operated without degrading an internal element of the semiconductor device and breaking the semiconductor device.

In addition, with the use of this embodiment mode, also in the case where a communication distance is long and electric power necessary to operate an internal circuit of the semiconductor device cannot be obtained from radiowaves received from the reader/writer only, communication with the reader/writer can be performed using a power supply charged by the battery.

Further, when storage capacity of the battery is sufficiently large, it becomes possible to mount a volatile memory such as a DRAM (random access memory) or SDAM (static random access memory) as a memory unit of the semiconductor device 700.

In this embodiment mode, two kinds of antennas, the antenna 112 and the antenna 113 are used. When two kinds of antennas are designed so as to have different resonance frequencies, the battery can be charged when communication with the reader/writer is not performed.

As a variation of the input circuit portion according to Embodiment Mode 7, one antenna can be used for both the antenna 112 and the antenna 113.

Since one antenna can be used for communication with the reader/writer and charging the battery, the size of the semiconductor device can be reduced.

This embodiment mode can be implemented in combination with technical elements in other embodiment modes in this specification. That is, with the use of the present invention, the impedances of the antenna and the chip included in the semiconductor device can intentionally be made not to match each other. Accordingly, operating failures can be prevented, which occur when the semiconductor device receives a large amount of electric power in a condition in which a communication distance between the semiconductor device and the reader/writer is extremely short and the like; thus, reliability of the semiconductor device can be improved. That is, the semiconductor device can be operated normally without degrading the elements in the semiconductor device and breaking the semiconductor device.

(Embodiment Mode 9)

This embodiment mode will describe the case where the semiconductor device of the present invention which transmits/receives data by wireless communication is used as an RF tag and use applications of a communication system using the RF tag. For example, the RF tag of the present invention can be provided for bills; coins; securities; bearer bonds; certificates (including driver's licenses and resident's cards); packing containers (including wrapping paper and bottles); DVD (digital versatile disc) software; and CDs (compact discs). Further, the RF tag of the present invention can also be provided for recording media such as video tapes; vehicles such as cars, motorcycles, and bicycles; personal belongings such as bags and glasses; foods; clothes; commodities; electronic appliances; and the like. The electronic appliances include a liquid crystal display device, an EL (electroluminescence) display device, a television device (it is also called simply a television or a television receiver), a mobile phone, and the like.

The RF tag of the present invention can be fixed to an object by being attached to the surface of the object or embedded in the object. For example, the RF tag may be embedded in paper of a book, or an organic resin of a package formed of the organic resin. The RF tag being provided for bills, coins, securities, bearer bonds, certificates, and the like can prevent forgery of them. Further, the RF tag being provided for wrapping containers, recording media, personal belongings, foods, clothes, commodities, electronic appliances, and the like can improve the efficiency of an inspection system, a system of a rental shop, and the like. Further, the RF tag being provided for vehicles can prevent forgery or theft of the vehicles. Further, the RF tag being implanted into creatures such as animals can identify each creature easily. For example, by implanting a wireless tag into creatures such as domestic animals, the year of birth, sex, breed, and the like thereof can be easily identified.

As described above, the RF tag of the present invention can be provided for any object (including creatures).

Figure 10A:
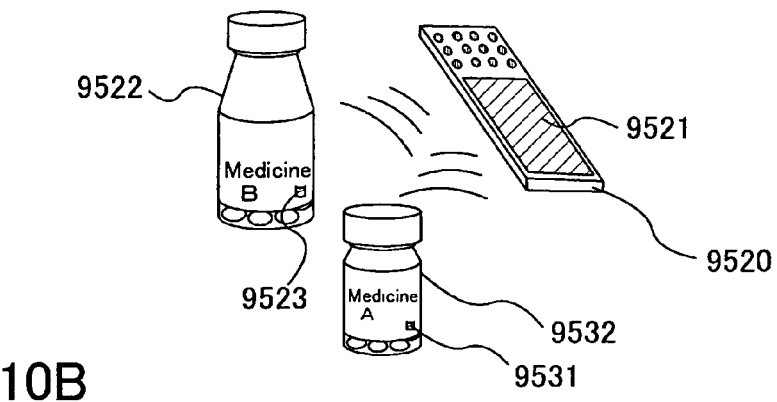
FIGS. 10A to 10C are diagrams showing application modes of a semiconductor device of the present invention.
Figure 10B:
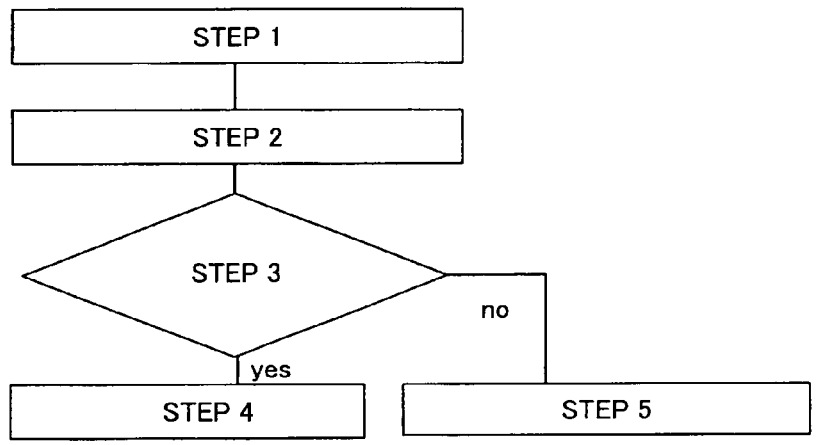

Next, one mode of a system using the RF tag is described with reference to FIG. 10A. A terminal 9520 including a display portion 9521 is provided with an antenna and a reader/writer connected to the antenna. An object A 9532 is provided with an RF tag 9531 of the present invention and an object B 9522 is provided with an RF tag 9523 of the present invention. In FIG. 10A, internal medicine is shown as each example of the objects A and B. When the antenna of the terminal 9520 is held close to the RF tag 9531 included in the object A 9532, the display portion 9521 displays information on the object A 9532 such as a raw material, a place of origin, a test result in each production process, a record of distribution, and description of the article. When the antenna of the terminal 9520 is held close to the RF tag 9523 included in the object B 9522, the display portion 9521 displays information on the object B 9522 such as a raw material, a place of origin, a test result in each production process, a record of distribution, and description of the object. An example of a business model utilizing the system shown in FIG. 10A is described with reference to a flow chart shown in FIG. 10B.

Information on allergy is inputted to the terminal 9520 (a first step 9001). The information on allergy is information on medical products, their components, or the like that may cause allergic reactions to certain people. As described above, information on the internal medicine A, which is the object A 9532, is obtained by the antenna provided for the terminal 9520 (a second step 9002). The information on the internal medicine A includes information on the components or the like of the internal medicine A. The information on allergy is compared with the obtained information on components or the like of the internal medicine A, and it is determined whether or not they coincide with each other (a third step 9003). If they coincide with each other, a user of the terminal 9520 is alerted that certain people may have allergic reactions to the internal medicine A (a fourth step 9004). If they do not coincide with each other, the user of the terminal 9520 is informed that certain people are at low risk of having allergic reactions to the internal medicine A (the fact that the internal medicine A is safe) (a fifth step 9005). In each of the fourth step 9004 and the fifth step 9005, in order to inform the user of the terminal 9520 of the information, the information may be displayed on the display portion 9521 of the terminal 9520 or an alarm of the terminal 9520 or the like may be sounded.

Figure 10C:
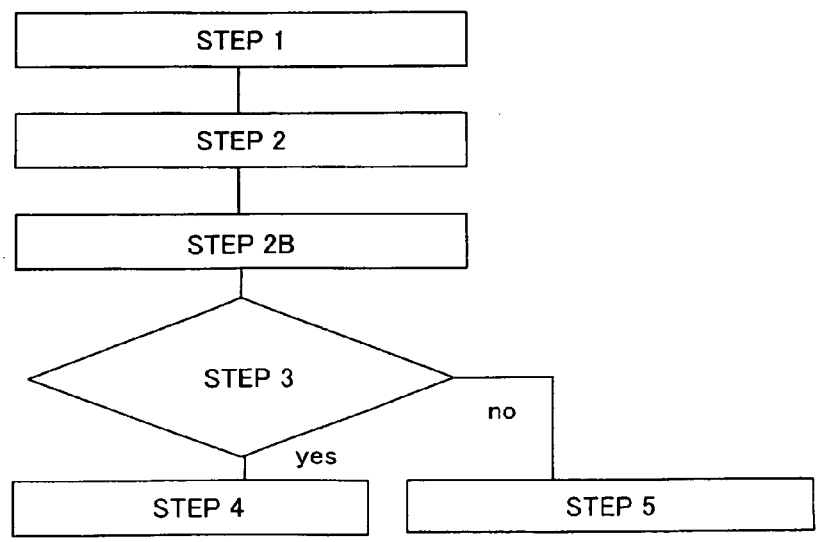

Further, an example of another business model is shown in FIG. 10C. Information on a combination of internal medicines which are dangerous when taken at the same time or a combination of components of internal medicines which are dangerous when taken at the same time (hereinafter referred to as combination information) is inputted to the terminal 9520 (a first step 9101). As described above, information on the internal medicine A, which is the object A 9532, is obtained by the antenna provided for the terminal 9520 (a second step 9102). The information on the internal medicine A includes information on components and the like of the internal medicine A. Next, as described above, information on the internal medicine B, which is the object B 9522, is obtained by the antenna provided for the terminal 9520 (a third step 9103). The information on the internal medicine B includes information on components and the like of the internal medicine B. In this way, information on a plurality of internal medicines is obtained. The combination information is compared with the obtained information on the plurality of internal medicines, and it is determined whether or not they coincide with each other, that is, whether a combination of components of internal medicines which are dangerous when taken at the same time is contained or not (a fourth step 9104). If they coincide with each other, the user of the terminal 9520 is alerted (a fifth step 9105). If they do not coincide with each other, the user of the terminal 9520 is informed of the safety (a sixth step 9106). In each of the fifth step 9105 and the sixth step 9106, in order to inform the user of the terminal 9520 of the information, the information may be displayed on the display portion 9521 of the terminal 9520 or an alarm of the terminal or the like may be sounded.

This embodiment mode can be implemented in combination with technical elements in other embodiment modes in this specification. That is, with the use of the present invention, impedances of the antenna and the chip included in the RF tag can intentionally be made not to match each other. Therefore, operating failures can be prevented, which are generated when the RF tag receives a large amount of electric power in a condition in which the communication distance between the RF tag and the reader/writer is extremely short and the like; therefore, reliability of the RF tag can be improved. That is, the RF tag can be operated normally without degrading the elements in the RF tag or breaking the RF tag.

(Embodiment Mode 10)

This embodiment mode will describe an example of a method for manufacturing the semiconductor device described in the preceding embodiment modes with reference to the drawings. This embodiment mode will describe the case where elements included in the input circuit portion, the logic circuit portion, and the charging battery portion, and the like of the semiconductor device are formed over one substrate using thin film transistors. In addition, an example in which a thin-film secondary battery is used as the battery provided in the charging battery portion will be described. Needless to say, an electric double layer capacitor or the like may be provided instead of the secondary battery. Note that this embodiment mode will describe the case where elements such as thin film transistors formed over a supporting substrate are transferred to a flexible substrate.

First, a peeling layer 1303 is formed over one surface of a substrate 1301 with an insulating film 1302 therebetween, and then an insulating film 1304 serving as a base film and a semiconductor film 1305 (e.g., a film containing amorphous silicon) are stacked thereover (FIG. 14A). Note that the insulating film 1302, the peeling layer 1303, the insulating film 1304, and the semiconductor film 1305 can be formed consecutively.

The substrate 1301 is selected from a glass substrate, a quartz substrate, a metal substrate (e.g., a stainless steel substrate), a ceramic substrate, a semiconductor substrate such as a Si substrate, a silicon-on-insulator (SOI) substrate, and the like. Alternatively, a plastic substrate made of polyethylene terephthalate (PET), polyethylene naphthalate (PEN), polyether sulfone (PES), acrylic, or the like can be used. In this process, although the peeling layer 1303 is provided over the entire surface of the substrate 1301 with the insulating film 1302 therebetween, the peeling layer 1303 can be selectively formed by a photolithography method after being provided over the entire surface of the substrate 1301, as needed.

The insulating films 1302 and 1304 are formed using insulating materials such as silicon oxide ($SiO_x$), silicon nitride ($SiN_x$), silicon oxynitride ($SiO_xN_y$, where x>y>0), or silicon nitride oxide ($SiN_xO_y$, where x>y>0) by a CVD method, a sputtering method, or the like. For example, when each of the insulating films 1302 and 1304 is formed to have a two-layer structure, a silicon nitride oxide film may be formed as a first insulating film and a silicon oxynitride film may be formed as a second insulating film. In addition, a silicon nitride film may be formed as the first insulating film and a silicon oxide film may be formed as the second insulating film. The insulating film 1302 serves as a blocking layer which prevents an impurity element contained in the substrate 1301 from diffusing into the peeling layer 1303 or elements formed thereover. The insulating film 1304 serves as a blocking layer which prevents an impurity element contained in the substrate 1301 or the peeling layer 1303 from diffusing into elements formed over the insulating film 1304. In this manner, providing the insulating films 1302 and 1304 which serve as the blocking layers can prevent adverse effects on the elements formed over the peeling layer 1303 or the insulating film 1304, which would otherwise be caused by an alkali metal such as Na or an alkaline earth metal contained in the substrate 1301 or by the impurity element contained in the peeling layer 1303. Note that when quartz is used for the substrate 1301, the insulating films 1302 and 1304 are not necessarily provided.

The peeling layer 1303 may be formed using a metal film or a stacked layer structure of a metal film and a metal oxide film. As a metal film, either a single layer or stacked layer structure is formed using an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), or an alloy material or a compound material containing any of those elements as its main component. In addition, the metal film or the metal oxide film can be formed by a sputtering method or various CVD methods such as a plasma CVD method. A stacked layer structure of a metal film and a metal oxide film can be obtained as follows: after forming the above-described metal film, plasma treatment is applied thereto under an oxygen atmosphere or an $N_2O$ atmosphere or heat treatment is applied thereto under an oxygen atmosphere or an $N_2O$ atmosphere; whereby an oxide or an oxynitride of the metal film can be formed on the surface of the metal film. For example, when a tungsten film is provided as a metal film by a sputtering method, a CVD method, or the like, a metal oxide film of tungsten oxide can be formed on the surface of the tungsten film by application of plasma treatment to the tungsten film. Alternatively, for example, after forming the metal film (such as a tungsten film), an insulating film such as silicon oxide is formed over the metal film by a sputtering method, so that metal oxide may be formed on the metal film (e.g., tungsten oxide on tungsten).

The amorphous semiconductor film 1305 is formed by a sputtering method, an LPCVD method, a plasma CVD method, or the like to have a thickness of 25 to 200 nm (preferably, 30 to 150 nm).

Then, the amorphous semiconductor film 1305 is crystallized by being irradiated with laser light. Alternatively, the amorphous semiconductor film 1305 may be crystallized by, for example, a method in which laser light irradiation is combined with a thermal crystallization method using an RTA or an annealing furnace, or with a thermal crystallization method using a metal element for promoting crystallization. After that, the obtained crystalline semiconductor film is etched to have desired shapes, so that crystalline semiconductor films 1305a to 1305f are formed. Then, a gate insulating film 1306 is formed so as to cover the crystalline semiconductor films 1305a to 1305f (FIG. 14B).

The gate insulating film 1306 is formed of an insulating material such as silicon oxide, silicon nitride, silicon oxynitride, or silicon nitride oxide, by a CVD method, a sputtering method, or the like. For example, when the gate insulating film 1306 has a two-layer structure, a silicon oxynitride film may be formed as a first insulating film and a silicon nitride oxide film may be formed as a second insulating film. Alternatively, a silicon oxide film may be formed as the first insulating film and a silicon nitride film may be formed as the second insulating film.

An example of a formation process of the crystalline semiconductor films 1305a to 1305f is briefly described below. First, an amorphous semiconductor film is formed by a plasma CVD method to have a thickness of 50 to 60 nm. Then, a solution containing nickel, which is a metal element for promoting crystallization, is retained on the amorphous semiconductor film, and dehydrogenation treatment (at 500° C., for one hour) and thermal crystallization treatment (at 550° C., for four hours) are performed on the amorphous semiconductor film. Thus, a crystalline semiconductor film is formed. After that, the crystalline semiconductor film is irradiated with laser light and is processed by a photolithography method, so that the crystalline semiconductor films 1305a to 1305f are formed. Note that the amorphous semiconductor film may be crystallized only by laser light irradiation, without thermal crystallization using a metal element for promoting crystallization.

For a laser oscillator used for crystallization, either a continuous wave laser (a CW laser) or a pulsed wave laser (a pulsed laser) can be used. As a laser beam which can be used here, a laser beam emitted from one or more of the following can be used: a gas laser such as an Ar laser, a Kr laser, or an excimer laser; a laser of which a medium is single crystalline YAG, $YVO_4$, forsterite ($Mg_2SiO_4$), $YAlO_3$, $GdVO_4$, or polycrystalline (ceramic) YAG, $Y_2O_3$, $YVO_4$, $YAlO_3$, or $GdVO_4$ doped with one or more of Nd, Yb, Cr, Ti, Ho, Er, Tm, and Ta as a dopant; a glass laser; a ruby laser; an alexandrite laser; a Ti:sapphire laser; a copper vapor laser; and a gold vapor laser. Crystals with a large grain size can be obtained by irradiation with fundamental waves of such a laser beam or second to fourth harmonics of the fundamental waves of such a laser beam. For example, the second harmonic (532 nm) or the third harmonic (355 nm) of an Nd:YVO$_4$ laser (fundamental wave: 1064 nm) can be used. A power density of the laser in this case needs to be about 0.01 to 100 MW/cm$^2$ (preferably, 0.1 to 10 MW/cm$^2$) and the scanning rate for the irradiation is set to be about 10 to 2000 cm/sec. Note that a laser of which a medium is single crystalline YAG, YVO$_4$, forsterite (Mg$_2$SiO$_4$), YAlO$_3$, or GdVO$_4$ or polycrystalline (ceramic) YAG, Y$_2$O$_3$, YVO$_4$, YAlO$_3$, or GdVO$_4$ doped with one or more of Nd, Yb, Cr, Ti, Ho, Er, Tm, and Ta as a dopant; an Ar ion laser; or a Ti:sapphire laser can be used as a CW laser, whereas such a laser can also be used as a pulsed laser with a repetition rate of greater than or equal to 10 MHz by a Q-switch operation, mode locking, or the like. In the case where a laser beam with a repetition rate of greater than or equal to 10 MHz is used, a semiconductor film is irradiated with the next pulse after the semiconductor film is melted by the laser and before it is solidified. Therefore, unlike the case of using a pulsed laser with a low repetition rate, a solid-liquid interface can be continuously moved in the semiconductor film, so that crystal grains which grow continuously in a scanning direction can be obtained.

Alternatively, the gate insulating film 1306 may be formed by oxidizing or nitriding the surfaces of the crystalline semiconductor films 1305a to 1305f by performing the foregoing high-density plasma treatment. For example, the gate insulating film 1306 is formed by plasma treatment in which a mixed gas of a rare gas such as He, Ar, Kr, or Xe and oxygen, nitrogen oxide (NO$_2$), ammonia, nitrogen, hydrogen or the like is introduced. When excitation of the plasma in this case is performed by introduction of a microwave, plasma with a low electron temperature and a high density can be generated. The surfaces of the crystalline semiconductor films can be oxidized or nitrided by oxygen radicals (which may include OH radicals) or nitrogen radicals (which may include NH radicals) generated by this high-density plasma.

By the treatment using such high-density plasma, an insulating film is formed over the semiconductor films to have a thickness of 1 to 20 nm, typically 5 to 10 nm. Since the reaction in this case is a solid-phase reaction, the interface state density between the insulating film and the semiconductor film can be quite low. Such high-density plasma treatment directly oxidizes (or nitrides) the semiconductor film (crystalline silicon or polycrystalline silicon), and thus, variation in thickness of the formed insulating film can be quite small, ideally. Further, crystal grain boundaries of crystalline silicon are not excessively oxidized, which makes a very preferable condition. In other words, by solid-phase oxidation of the surface of the semiconductor film by the high-density plasma treatment described here, an insulating film with good uniformity and low interface state density can be formed without excessive oxidation reaction at the crystal grain boundaries.

As the gate insulating film, an insulating film formed by high-density plasma treatment may only be used, or an insulating film of silicon oxide, silicon oxynitride, silicon nitride, or the like may be deposited by a CVD method utilizing plasma or thermal reaction to be stacked therewith. In any case, transistors including insulating films formed by high-density plasma as a part of gate insulating films or as the gate insulating films can have less variation in characteristics.

Further, the crystalline semiconductor films 1305a to 1305f, which are obtained by irradiating the semiconductor film with a continuous wave laser beam or a laser beam oscillated with a repetition rate of greater than or equal to 10 MHz and scanning the semiconductor film with the laser beam in one direction to crystallize the semiconductor film, have a characteristic such that the crystal grows in the scanning direction of the beam. When transistors are arranged so that the scanning direction corresponds to their channel length direction (a direction in which carriers flow when a channel formation region is formed) and the foregoing gate insulating film is combined therewith, thin film transistors (TFTs) with less characteristic variation and high field effect mobility can be obtained.

Next, a first conductive film and a second conductive film are formed to be stacked over the gate insulating film 1306. Here, the first conductive film is formed by a CVD method, a sputtering method, or the like to have a thickness of 20 to 100 nm. The second conductive film is formed to have a thickness of 100 to 400 nm. The first and the second conductive films are formed of an element selected from tantalum (Ta), tungsten (W), titanium (Ti), molybdenum (Mo), aluminum (Al), copper (Cu), chromium (Cr), niobium (Nb), and the like, or an alloy material or a compound material containing any of those elements as its main component. Alternatively, the first and the second conductive films are formed of a semiconductor material typified by polycrystalline silicon doped with an impurity element such as phosphorus. As examples of a combination of the first conductive film and the second conductive film, a tantalum nitride film and a tungsten film, a tungsten nitride film and a tungsten film, a molybdenum nitride film and a molybdenum film, and the like can be given. Since tungsten or tantalum nitride have high heat resistance, heat treatment for thermal activation can be performed after the formation of the first and the second conductive films. In addition, in the case of a three-layer structure instead of a two-layer structure, a stacked layer structure including a molybdenum film, an aluminum film, and a molybdenum film may be employed.

Next, a mask formed of a resist is formed by a photolithography method, and etching treatment is performed for forming a gate electrode and a gate wiring. Thus, gate electrodes 1307 are formed over the crystalline semiconductor films 1305a to 1305f. Here, an example in which the gate electrode 1307 has a stacked layer structure including a first conductive film 1307a and a second conductive film 1307b is shown.

Next, the crystalline semiconductor films 1305a to 1305f are doped with an impurity element imparting n-type conductivity at low concentration by an ion doping method or an ion implantation method with the use of the gate electrodes 1307 as masks. Then, a mask formed of a resist is formed selectively by a photolithography method, and an impurity element imparting p-type conductivity is added at high concentration. As the n-type impurity element, phosphorus (P), arsenic (As), or the like can be used. As the p-type impurity element, boron (B), aluminum (Al), gallium (Ga), or the like can be used. Here, phosphorus (P) is used as the impurity element imparting n-type conductivity and is selectively introduced into the crystalline semiconductor films 1305a to 1305f so as to be contained at a concentration of $1 \times 10^{15}$ to $1 \times 10^{19}/\text{cm}^3$; thus, n-type impurity regions 1308 are formed. Further, boron (B) is used as the impurity element imparting p-type conductivity and is selectively introduced into the crystalline semiconductor films 1305c and 1305e so as to be contained at a concentration of $1 \times 10^{19}$ to $1 \times 10^{20}/\text{cm}^3$; thus, p-type impurity regions 1309 are formed (FIG. 14C).

Next, an insulating film is formed so as to cover the gate insulating film 1306 and the gate electrodes 1307. The insulating film is formed to have a single layer or stacked layer structure of a film containing an inorganic material such as silicon, an oxide of silicon, or a nitride of silicon, or a film containing an organic material such as an organic resin, by a plasma CVD method, a sputtering method, or the like. Then, the insulating film is selectively etched by anisotropic etching mainly in the perpendicular direction, so that insulating films 1310 (also referred to as side walls) which are in contact with the side surfaces of the gate electrodes 1307 are formed. The insulating films 1310 are used as masks in doping for forming lightly doped drain (LDD) regions.

Next, the crystalline semiconductor films 1305a, 1305b, 1305d, and 1305f are doped with an impurity element imparting n-type conductivity at a high concentration with the use of a mask formed of a resist by a photolithography method, the gate electrodes 1307, and the insulating films 1310 as masks. Thus, n-type impurity regions 1311 are formed. Here, phosphorus (P) is used as the impurity element imparting n-type conductivity and is selectively introduced into the crystalline semiconductor films 1305a, 1305b, 1305d, and 1305f so as to be contained at a concentration of $1\times10^{19}$ to $1\times10^{20}/cm^3$; thus, the n-type impurity regions 1311 with higher concentration of impurity than the impurity regions 1308 are formed.

Through the foregoing steps, n-channel thin film transistors 1300a, 1300b, 1300d, and 1300f, and p-channel thin film transistors 1300c and 1300e are formed (FIG. 14D).

In the n-channel thin film transistor 1300a, a channel formation region is formed in a region in the crystalline semiconductor film 1305a which overlaps with the gate electrode 1307, the impurity region 1311 forming a source region or a drain region is formed in a region which does not overlap with the gate electrode 1307 and the insulating film 1310, and a lightly doped drain region (LDD region) is formed in a region which overlaps with the insulating film 1310 and which is between the channel formation region and the impurity region 1311. Also in each of the n-channel thin film transistors 1300b, 1300d, and 1300f, a channel formation region, a lightly doped drain region, and the impurity region 1311 are formed in a similar manner.

In the p-channel thin film transistor 1300c, a channel formation region is formed in a region in the crystalline semiconductor film 1305c which overlaps with the gate electrode 1307, and the impurity region 1309 forming a source region or a drain region is formed in a region which does not overlap with the gate electrode 1307. Also in the p-channel thin film transistor 1300e, a channel formation region and the impurity region 1309 are formed in a similar manner. Note that although an LDD region is not provided in the p-channel thin film transistors 1300c and 1300e, the LDD region may be provided in the p-channel thin film transistor, or the n-channel thin film transistor may have a structure without LDD regions.

Next, a single layer or stacked layer structure of an insulating film is formed so as to cover the crystalline semiconductor films 1305a to 1305f, the gate electrodes 1307, and the like; and conductive films 1313 which are electrically connected to the impurity regions 1309 and 1311 which form source regions or drain regions in the thin film transistors 1300a to 1300f are formed over the insulating film (FIG. 15A). The insulating film is formed to have a single layer or stacked layer structure of an inorganic material such as an oxide of silicon or a nitride of silicon, an organic material such as polyimide, polyamide, benzocyclobutene, acrylic, or epoxy, a siloxane material, or the like, by a CVD method, a sputtering method, an SOG method, a droplet discharging method, a screen printing method, or the like. Here, the insulating film has a two-layer structure, in which a silicon nitride oxide film is formed as a first insulating film 1312a, and a silicon oxynitride film is formed as a second insulating film 1312b. In addition, the conductive films 1313 can form source electrodes or drain electrodes of the thin film transistors 1300a to 1300f.

Note that, before the insulating films 1312a and 1312b are formed or after one or both of thin films of the insulating films 1312a and 1312b are formed, heat treatment may be performed for recovering the crystallinity of the semiconductor film, for activating the impurity elements which have been added into the semiconductor film, or for hydrogenating the semiconductor film. As this heat treatment, thermal annealing, a laser annealing method, an RTA method, or the like may be employed.

The conductive film 1313 is formed to have a single layer or stacked layer structure of an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing any of those elements as its main component by a CVD method, a sputtering method, or the like. An alloy material containing aluminum as its main component corresponds to, for example, a material which contains aluminum as its main component and also contains nickel, or an alloy material which contains aluminum as its main component and which also contains nickel and one or both carbon and silicon. The conductive film 1313 preferably employs, for example, a stacked layer structure including a barrier film, an aluminum-silicon (Al—Si) film, and a barrier film, or a stacked layer structure including a barrier film, an aluminum-silicon (Al—Si) film, a titanium nitride film, and a barrier film. Note that the barrier film refers to a thin film formed of titanium, a nitride of titanium, molybdenum, or a nitride of molybdenum. Aluminum and aluminum silicon have low resistance and are inexpensive; therefore, they are optimal materials for forming the conductive film 1313. In addition, generation of a hillock of aluminum or aluminum silicon can be prevented when upper and lower barrier layers are formed. Furthermore, when the barrier film is formed of titanium, which is an element with a high reducing property, even when a thin natural oxide film is formed on the crystalline semiconductor film, the natural oxide film can be reduced; so that preferable contact with the crystalline semiconductor film can be obtained.

Next, an insulating film 1314 is formed so as to cover the conductive films 1313. And then, conductive films 1315a and 1315b to be electrically connected to the conductive films 1313, which form the source electrode or drain electrode of the thin film transistors 1300a and 1300f, are formed over the insulating film 1314. A conductive film 1316 to be electrically connected to the conductive film 1313, which forms the source electrode or drain electrode of the thin film transistor 1300b, is formed. Note that the conductive films 1315a and 1315b and the conductive film 1316 may be formed of the same material at the same time. The conductive films 1315a and 1315b and the conductive film 1316 can be formed of any of the foregoing materials which are given as materials for the conductive film 1313.

Next, a conductive film 1317 which serves as an antenna is formed so as to be electrically connected to the conductive film 1316 (FIG. 15B).

The insulating film 1314 can be formed to have a single layer or stacked layer structure of an insulating film containing oxygen and/or nitrogen such as silicon oxide, silicon nitride, silicon oxynitride, or silicon nitride oxide, a film containing carbon such as DLC (diamond-like carbon), a film of an organic material such as epoxy, polyimide, polyamide, polyvinyl phenol, benzocyclobutene, or acrylic, or a film of a siloxane material such as a siloxane resin, which is formed by a CVD method, a sputtering method, or the like. Note that a siloxane material refers to a material including a Si—O—Si bond. Siloxane has a skeleton structure containing a bond of silicon (Si) and oxygen (O). As a substituent, an organic group containing at least hydrogen (e.g., an alkyl group or aromatic hydrocarbon) is used. Alternatively, a fluoro group can be used as the substituent. Further alternatively, both an organic group containing at least hydrogen and a fluoro group may be used as the substituent.

The conductive film 1317 is formed of a conductive material by using a CVD method, a sputtering method, a printing method such as a screen printing method or a gravure printing method, a droplet discharging method, a dispensing method, a plating method, or the like. The conductive material is an element selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing any of those elements as its main component. The conductive film is formed to have a single layer or stacked layer structure.

For example, in the case of forming the conductive film 1317 which serves as the antenna by using a screen printing method, the conductive film 1317 can be provided by selectively printing a conductive paste in which conductive particles having a grain size of several nanometers to several tens of micrometers are dissolved or dispersed in an organic resin. As the conductive particles, metal particles of one or more of silver (Ag), gold (Au), copper (Cu), nickel (Ni), platinum (Pt), palladium (Pd), tantalum (Ta), molybdenum (Mo), titanium (Ti), and the like, fine particles of silver halide, or dispersing nanoparticles thereof can be used. In addition, as the organic resin contained in the conductive paste, one or more of organic resins selected from organic resins which serve as a binder, a solvent, a dispersing agent, and a coating member for the metal particles can be used. Typically, an organic resin such as an epoxy resin or a silicone resin can be used. Further, in the formation of the conductive film, baking is preferably performed after the conductive paste is applied. For example, in the case of using fine particles (with the grain size of, for example, greater than or equal to 1 nm and less than or equal to 100 nm) containing silver as its main component as a material for the conductive paste, the conductive paste is baked and hardened at temperatures of 150 to 300° C., so that the conductive film can be obtained. Alternatively, fine particles containing solder or lead-free solder as its main component may be used; in that case, fine particles having a grain size of less than or equal to 20 μm are preferably used. Solder or lead-free solder has advantages of low cost.

The conductive films 1315*a* and 1315*b* can serve as wirings which are electrically connected to a secondary battery included in the semiconductor device of the present invention in a later step. In addition, in forming the conductive film 1317 which serves as an antenna, other conductive films may be separately formed so as to be electrically connected to the conductive films 1315*a* and 1315*b* and the conductive films can be utilized as the wirings for connecting the conductive films 1315*a* and 1315*b* to the secondary battery.

Next, an insulating film 1318 is formed so as to cover the conductive film 1317, after that, a layer including the thin film transistors 1300*a* to 1300*f*, the conductive film 1317, and the like (hereinafter, referred to as an element formation layer 1319) is peeled off from the substrate 1301. Here, openings are formed by laser light (e.g., UV light) irradiation in regions where the thin film transistors 1300*a* to 1300*f* are not formed (FIG. 15C), then, the element formation layer 1319 can be peeled off from the substrate 1301 by physical force. Note that when the element formation layer 1319 is peeled off by being wet with a liquid such as water, the thin film transistor provided in the element formation layer 1319 can be prevented from being broken by static electricity. Further, the substrate 1301 from which the element formation layer 1319 is peeled off can be reused, whereby the cost can be reduced.

The insulating film 1318 can be formed to have a single layer or stacked layer structure of an insulating film containing oxygen and/or nitrogen such as silicon oxide, silicon nitride, silicon oxynitride, or silicon nitride oxide, a film containing carbon such as DLC (diamond-like carbon), a film of an organic material such as epoxy, polyimide, polyamide, polyvinyl phenol, benzocyclobutene, or acrylic, or a film of a siloxane material such as a siloxane resin by a CVD method, a sputtering method, or the like.

Figure 16A:
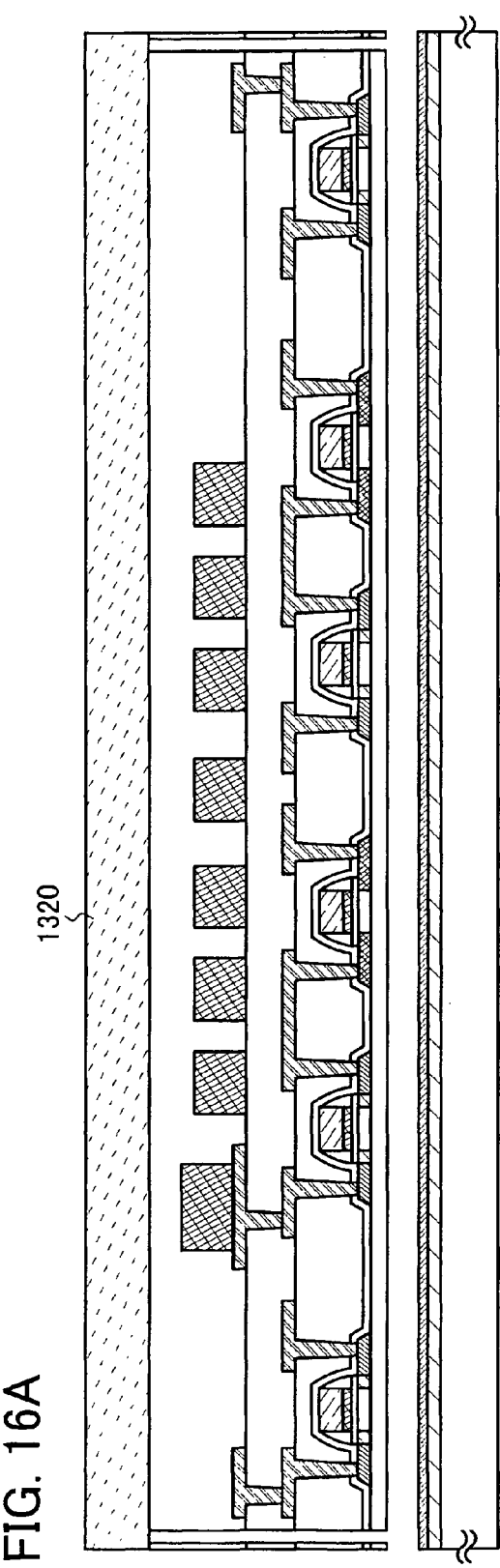
FIGS. 16A and 16B are views each showing an example of a method for manufacturing a semiconductor device of the present invention.

In this embodiment mode, after the openings are formed in the element formation layer 1319 by laser light irradiation, a first sheet material 1320 is attached to one surface of the element formation layer 1319 (the surface where the insulating film 1318 is exposed), and then, the element formation layer 1319 is peeled off from the substrate 1301 (FIG. 16A).

Figure 16B:
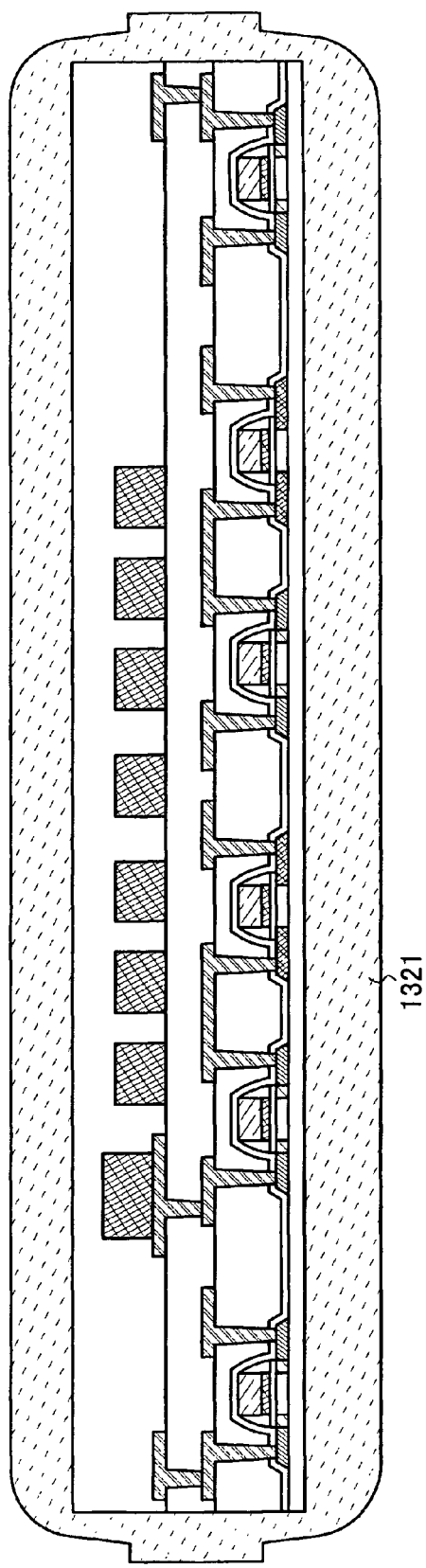

Next, a second sheet material 1321 is provided on the other surface (the surface exposed by peeling) of the element formation layer 1319, then, the second sheet material 1321 is attached to the surface by one or both of heat treatment and pressure treatment (FIG. 16B). As the first sheet material 1320 and the second sheet material 1321, a hot-melt film or the like can be used.

As the first sheet material 1320 and the second sheet material 1321, a film on which antistatic treatment for preventing static electricity or the like is performed (hereinafter referred to as an antistatic film) can be used. As examples of the antistatic film, a film in which an antistatic material is dispersed in a resin, a film provided with an antistatic material attached thereon, or the like can be given. The film provided with an antistatic material may be a film provided with an antistatic material on one of its surfaces, or a film provided with an antistatic material on each surface. As for the film provided with an antistatic material on one of its surfaces, the film may be attached to the layer so that the antistatic material is placed on the inner side of the film or the outer side of the film. Note that the antistatic material may be provided on the entire surface of the film, or on a part thereof. As the antistatic material here, a metal, indium tin oxide (ITO), a surfactant such as an amphoteric surfactant, a cationic surfactant, or a nonionic surfactant can be used. Further, as an antistatic material, a resin material containing cross-linked copolymer having a carboxyl group and a quaternary ammonium base on its side chain, or the like can be used. Such a material is attached, mixed, or applied to a film, to form an antistatic film. The element formation layer is sealed using the antistatic film, so that the semiconductor elements can be protected from adverse effects such as external static electricity when being handled as a commercial product.

Note that as for a battery provided in a charging battery portion of the semiconductor device, a thin-film secondary battery is connected to the conductive films 1315*a* and 1315*b*. The connection with the secondary battery may be made before the element formation layer 1319 is peeled off from the substrate 1301 (at the stage shown in FIG. 15B or FIG. 15C), after the element formation layer 1319 is peeled off from the substrate 1301 (at the stage shown in FIG. 16A), or after the element formation layer 1319 is sealed with the first sheet material and the second sheet material (at the stage shown in FIG. 16B). An example in which the element formation layer 1319 and the secondary battery are connected to each other is described below with reference to FIGS. 17A to 18B.

Figure 17A:
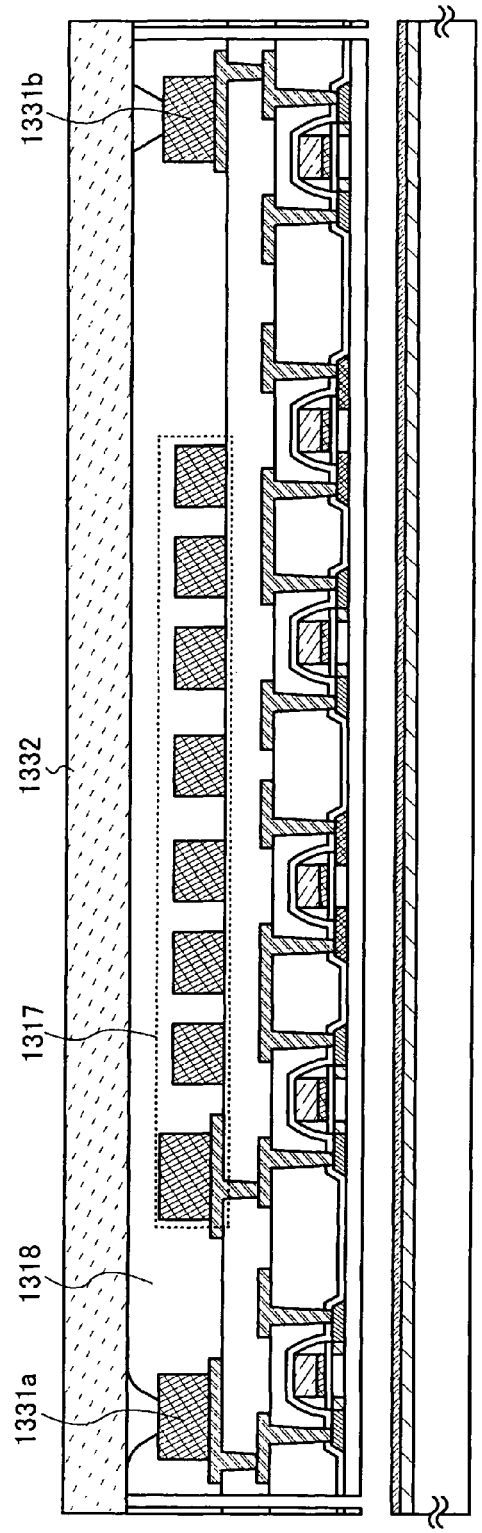
FIGS. 17A and 17B are views each showing an example of a method for manufacturing a semiconductor device of the present invention.

Conductive films 1331*a* and 1331*b* which are electrically connected to the conductive films 1315*a* and 1315*b*, respectively, are formed at the same time as the conductive film 1317 which serves as an antenna in FIG. 16B. Next, the insulating film 1318 is formed so as to cover the conductive film 1317 and the conductive films 1331a and 1331b. Then, openings 1332a and 1332b are formed so as to expose the surfaces of the conductive films 1331a and 1331b. After that, the openings are formed in the element formation layer 1319 by laser irradiation, and then a first sheet material 1332 is attached to one surface of the element formation layer 1319 (the surface where the insulating film 1318 is exposed), so that the element formation layer 1319 is peeled off from the substrate 1301 (FIG. 17A).

Figure 17B:
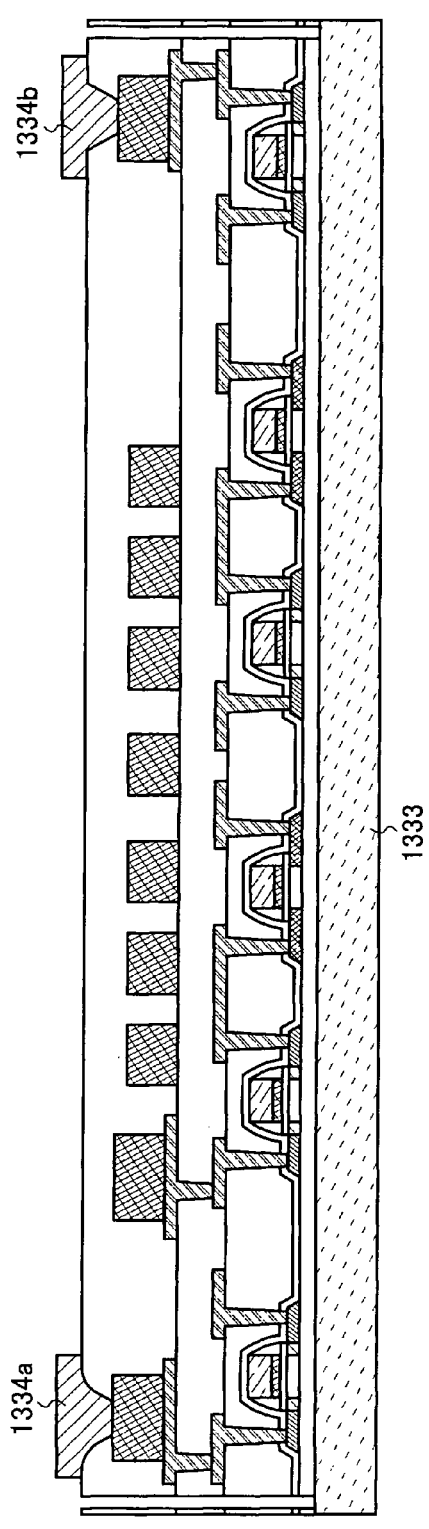

Next, a second sheet material 1333 is attached to the other surface of the element formation layer 1319 (the surface exposed by peeling), and the element formation layer 1319 is peeled off from the first sheet material 1332. Therefore, a material with low adhesiveness is used as the first sheet material 1332. Then, conductive films 1334a and 1334b which are electrically connected to the conductive films 1331a and 1331b, respectively through the openings 1332a and 1332b are selectively formed (FIG. 17B).

The conductive films 1334a and 1334b are formed of a conductive material by a CVD method, a sputtering method, a printing method such as screen printing or gravure printing, a droplet discharging method, a dispenser method, a plating method, or the like. The conductive material is any of the elements selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing any of those elements as its main component. The conductive films are formed to have a single layer or stacked layer structure.

Although the example shown here is the case where the conductive films 1334a and 1334b are formed after peeling the element formation layer 1319 off from the substrate 1301, the element formation layer 1319 may be peeled off from the substrate 1301 after the formation of the conductive films 1334a and 1334b.

Figure 18A:
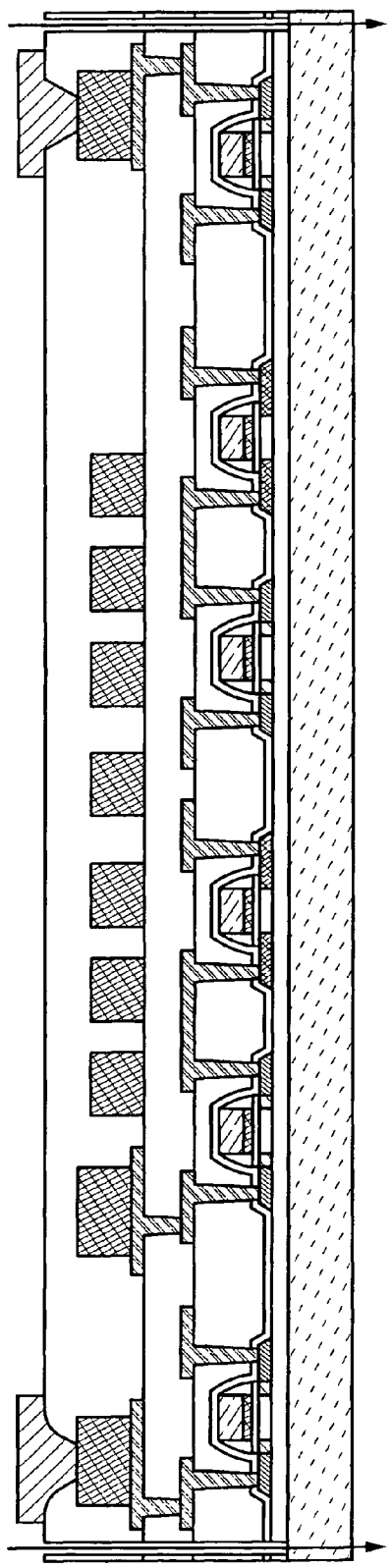
FIGS. 18A and 18B are views each showing an example of a method for manufacturing a semiconductor device of the present invention.

Next, in the case where a plurality of elements are formed over the substrate, the element formation layer 1319 is cut into elements (FIG. 18A). A laser irradiation apparatus, a dicing apparatus, a scribing apparatus, or the like can be used for the cutting. At this time, the plurality of elements formed over one substrate are separated from one another by laser light irradiation.

Figure 18B:
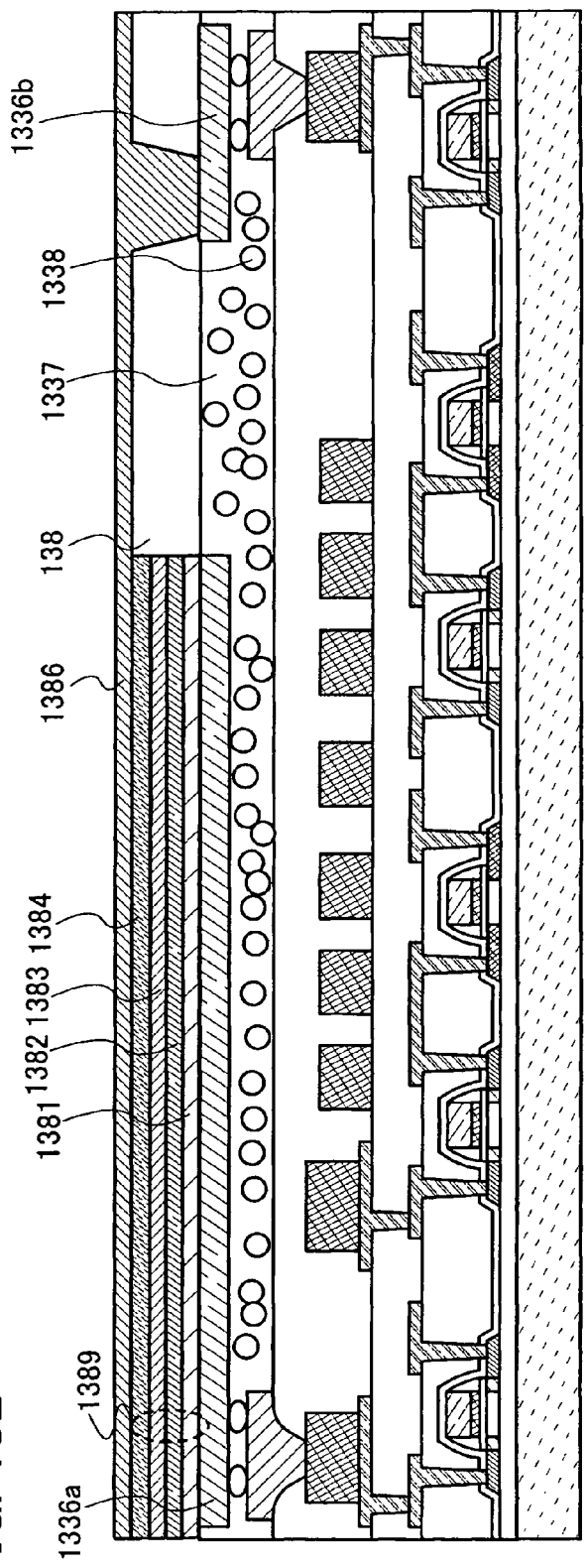

Next, the separated elements are electrically connected to the secondary battery (FIG. 18B). In this embodiment mode, a thin-film secondary battery is used as the battery of the charging battery portion of the semiconductor device, in which a current-collecting thin film, a negative electrode active material layer, a solid electrolyte layer, a positive electrode active material layer, and a current-collecting thin film are stacked in this order.

Conductive films 1336a and 1336b are formed of a conductive material by a CVD method, a sputtering method, a printing method such as screen printing or gravure printing, a droplet discharging method, a dispenser method, a plating method, or the like. The conductive material is an element selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing any of those elements as its main component. The conductive films are formed to have a single layer or stacked layer structure. The conductive material needs to have high adhesion to a negative electrode active material as well as low resistance. In particular, aluminum, copper, nickel, vanadium, or the like is preferably used.

The structure of a thin-film secondary battery 1389 is described next in detail. A negative electrode active material layer 1381 is formed over the conductive film 1336a. In general, vanadium oxide ($V_2O_5$) or the like is used. Next, a solid electrolyte layer 1382 is formed over the negative electrode active material layer 1381. In general, lithium phosphate ($Li_3PO_4$) or the like is used. Next, a positive electrode active material layer 1383 is formed over the solid electrolyte layer 1382. In general, lithium manganate ($LiMn_2O_4$) or the like is used. Lithium cobaltate ($LiCoO_2$) or lithium nickel oxide ($LiNiO_2$) may also be used. Next, a current-collecting thin film 1384 to serve as an electrode is formed over the positive electrode active material layer 1383. The current-collecting thin film 1384 needs to have high adhesion to the positive electrode active material layer 1383 as well as low resistance. For example, aluminum, copper, nickel, vanadium, or the like can be used.

Each of the above thin layers of the negative electrode active material layer 1381, the solid electrolyte layer 1382, the positive electrode active material layer 1383, and the current-collecting thin film 1384 may be formed by a sputtering technique or an evaporation technique. In addition, the thickness of each layer is preferably 0.1 to 3 μm.

Next, an interlayer film 1385 is formed by application of a resin. The interlayer film is etched to form a contact hole. The interlayer film is not limited to a resin, and another film such as a CVD oxide film may be used as well; however, a resin is preferably used in terms of flatness. Alternatively, the contact hole may be formed without using etching, but using a photosensitive resin. Next, a wiring layer 1386 is formed over the interlayer film and is connected to the conductive film 1336b. Thus, an electrical connection between the thin-film secondary battery and the element is secured.

Here, the conductive films 1334a and 1334b which are provided in the element formation layer 1319 are connected to the conductive films 1336a and 1336b, which serve as connection terminals of the thin-film secondary battery 1389, respectively in advance. Here, an example is shown in which an electrical connection between the conductive films 1334a and 1336a or an electrical connection between the conductive films 1334b and 1336b is achieved by pressure bonding with an adhesive material such as an anisotropic conductive film (ACF) or an anisotropic conductive paste (ACP) therebetween. Here, an example is shown in which the connection is achieved using conductive particles 1338 included in an adhesive resin 1337. Alternatively, a conductive adhesive such as a silver paste, a copper paste, or a carbon paste; solder joint; or the like can be used for the connection.

The structures of such transistors can be various and are not limited to the specific structures shown in this embodiment mode. For example, a multi-gate structure having two or more gate electrodes may be employed. When a multi-gate structure is employed, a structure in which channel regions are connected in series is provided; therefore, a structure in which a plurality of transistors are connected in series is provided. When a multi-gate structure is employed for the transistor, off-current can be reduced; withstand voltage of the transistor can be increased, so that the reliability is increased; and even if drain-source voltage changes when the transistor operates in the saturation region, drain-source current does not change very much, and thus flat characteristics of drain current can be obtained. Further, a structure in which gate electrodes are formed above and below a channel may also be employed. When the structure in which gate electrodes are provided above and below a channel is employed, the channel region is enlarged and the amount of current flowing therethrough can be increased. Thus, a depletion layer can be easily formed and the subthreshold swing can be decreased. When gate electrodes are formed above and below a channel, a structure in which a plurality of transistors are connected in parallel is made.

Alternatively, the transistor may have any of the following structures: a structure in which a gate electrode is provided above a channel, a structure in which a gate electrode is provided below a channel, a staggered structure, and an inverted staggered structure. Further alternatively, a structure in which a channel region is divided into a plurality of regions and the divided channel regions are connected in parallel or in series may be employed. In addition, a channel (or a part thereof) may overlap with a source electrode or a drain electrode. When a structure in which a channel (or a part thereof) overlaps with a source electrode or a drain electrode is employed, electric charge can be prevented from being accumulated in a part of the channel and thus an unstable operation can be prevented. Further, an LDD region may be provided. When an LDD region is provided, off-current can be reduced; the withstand voltage of the transistor can be increased, so that the reliability is increased; and even if drain-source voltage changes when the transistor operates in the saturation region, drain-source current does not change very much, and thus flat characteristics of drain current can be obtained.

Note that a method for manufacturing a semiconductor device in this embodiment mode can be applied to the semiconductor device in other embodiment modes described in this specification.

(Embodiment Mode 11)

In this embodiment mode, a method for manufacturing a semiconductor device, which is different from that of Embodiment Mode 9, will be described with reference to the drawings. This embodiment mode describes a structure in which elements included in an input circuit portion, a logic circuit portion, a charging battery portion, and the like of a semiconductor device are formed over one substrate. Note that this embodiment mode describes an example in which the thin-film secondary battery described in Embodiment Mode 10 is used as a battery provided in the charging battery portion. Needless to say, an electric double layer capacitor or the like may also be provided instead of the secondary battery.

Figure 11A:
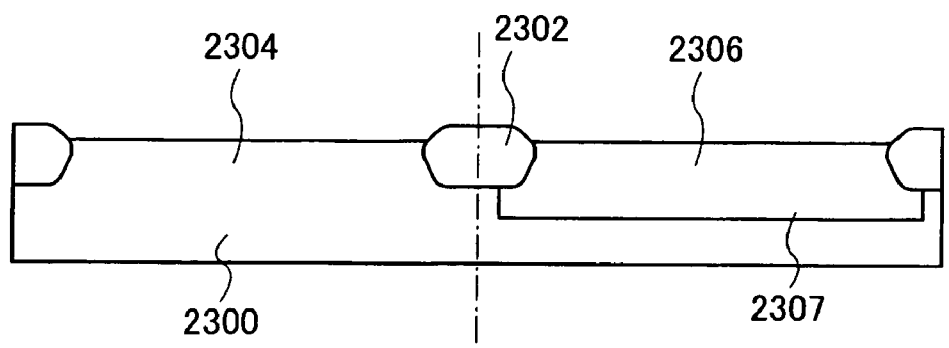
FIGS. 11A to 11C are views showing an example of a method for manufacturing a semiconductor device of the present invention.

First, an insulating film (also referred to as a field oxide film) 2302 is formed on a semiconductor substrate 2300 to form region regions (also referred to as element formation regions or element separation regions) 2304 and 2306 (FIG. 11A). The regions 2304 and 2306 provided in the semiconductor substrate 2300 are insulated from each other by the insulating film 2302. The example shown here is the case where a single crystalline Si substrate having n-type conductivity is used as the semiconductor substrate 2300, and a p-well 2307 is formed in the region 2306 in the semiconductor substrate 2300.

Any substrate can be used as the semiconductor substrate 2300 as long as it is a semiconductor substrate. For example, a single crystalline Si substrate having n-type or p-type conductivity, a compound semiconductor substrate (e.g., a GaAs substrate, an InP substrate, a GaN substrate, a SiC substrate, a sapphire substrate, or a ZnSe substrate), an SOI (silicon on insulator) substrate formed by a bonding method or a SIMOX (separation by implanted oxygen) method, or the like can be used.

The regions 2304 and 2306 can be formed by appropriately using a local oxidation of silicon (LOCOS) method, a trench isolation method, or the like.

In addition, the p-well formed in the region 2306 in the semiconductor substrate 2300 can be formed by selective doping of the semiconductor substrate 2300 with a p-type impurity element. As a p-type impurity element, boron (B), aluminum (Al), gallium (Ga), or the like can be used.

In this embodiment mode, although the region 2304 is not doped with an impurity element because a semiconductor substrate having n-type conductivity is used as the semiconductor substrate 2300, an n-well may be formed in the region 2304 by doping with an n-type impurity element. As an n-type impurity element, phosphorus (P), arsenic (As), or the like can be used. When a semiconductor substrate having p-type conductivity is used, on the other hand, the region 2304 may be doped with an n-type impurity element to form an n-well, whereas the region 2306 may be doped with no impurity element.

Figure 11B:
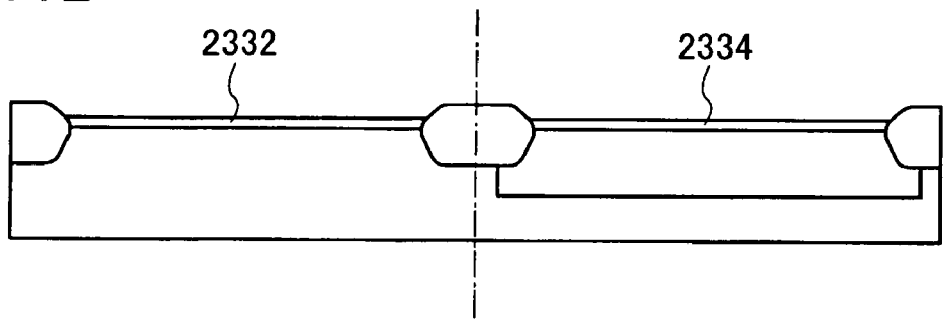

Next, insulating films 2332 and 2334 are formed so as to cover the regions 2304 and 2306, respectively (FIG. 11B).

For example, the surfaces of the regions 2304 and 2306 provided in the semiconductor substrate 2300 are oxidized by heat treatment, so that the insulating films 2332 and 2334 can be formed of silicon oxide films. Alternatively, the insulating films may be formed to have a stacked layer structure of a silicon oxide film and a film containing oxygen and nitrogen (a silicon oxynitride film) by forming a silicon oxide film by a thermal oxidation method and then nitriding the surface of the silicon oxide film by nitridation treatment.

Further alternatively, the insulating films 2332 and 2334 may be formed by plasma treatment as described above. For example, the insulating films 2332 and 2334 can be formed using a silicon oxide film or a silicon nitride film which is obtained by application of oxidation or nitridation treatment using high-density plasma to the surfaces of the regions 2304 and 2306 provided in the semiconductor substrate 2300. Furthermore, after applying oxidation treatment using high-density plasma to the surfaces of the regions 2304 and 2306, nitridation treatment using high-density plasma may be performed. In that case, silicon oxide films are formed on the surfaces of the regions 2304 and 2306, and then silicon oxynitride films are formed on the silicon oxide films. Thus, the insulating films 2332 and 2334 are each formed to have a stacked layer structure including the silicon oxide film and the silicon oxynitride film. After the silicon oxide films are formed on the surfaces of the regions 2304 and 2306 by a thermal oxidation method, oxidation or nitridation treatment using high-density plasma may be applied to the silicon oxide films.

The insulating films 2332 and 2334 formed over the regions 2304 and 2306 in the semiconductor substrate 2300 serve as the gate insulating films of transistors which are completed later.

Figure 11C:
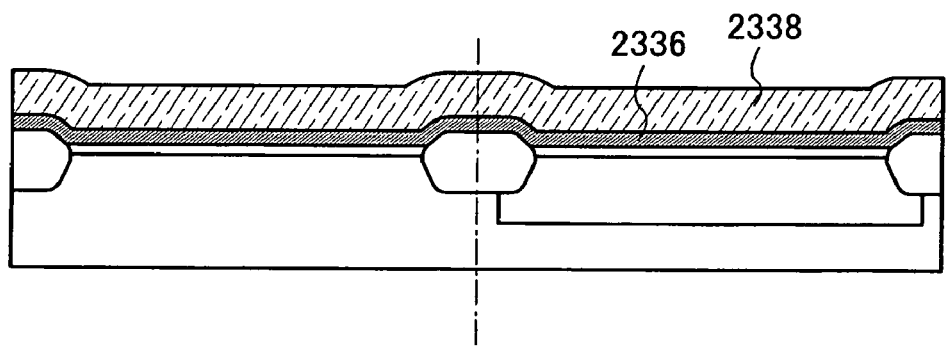

Next, a conductive film is formed so as to cover the insulating films 2332 and 2334, which are formed over the regions 2304 and 2306, respectively (FIG. 11C). Here, an example is shown in which the conductive film is formed by sequentially stacking conductive films 2336 and 2338. Needless to say, the conductive film may be formed to have a single layer or a stacked layer structure of three or more layers.

As materials of the conductive films 2336 and 2338, an element selected from tantalum (Ta), tungsten (W), titanium (Ti), molybdenum (Mo), aluminum (Al), copper (Cu), chromium (Cr), niobium (Nb), and the like, or an alloy material or a compound material containing any of those elements as its main component can be used. Alternatively, a metal nitride film obtained by nitridation of any of those elements can be used. Further alternatively, a semiconductor material typified by polycrystalline silicon doped with an impurity element such as phosphorus can be used.

Here, a stacked layer structure is provided which includes the conductive film 2336 formed using tantalum nitride and the conductive film 2338 formed thereover using tungsten. Alternatively, the conductive film 2336 can be formed to have a single layer or stacked layer using any of tungsten nitride, molybdenum nitride, and titanium nitride, and the conductive film 2338 can be formed to have a single layer or stacked layer using any of tantalum, molybdenum, and titanium.

Figure 12A:
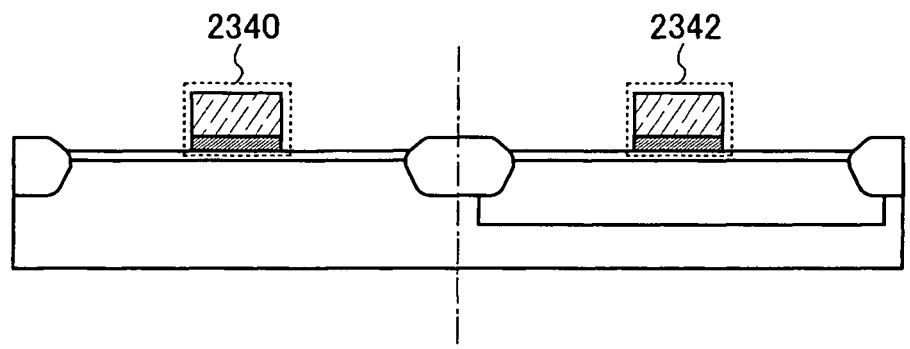
FIGS. 12A to 12C are views each showing an example of a method for manufacturing a semiconductor device of the present invention.

Next, the stacked conductive films 2336 and 2338 are selectively removed by etching, so that the conductive films 2336 and 2338 remain above parts of the regions 2304 and 2306. Thus, gate electrodes 2340 and 2342 are formed (FIG. 12A).

Figure 12B:
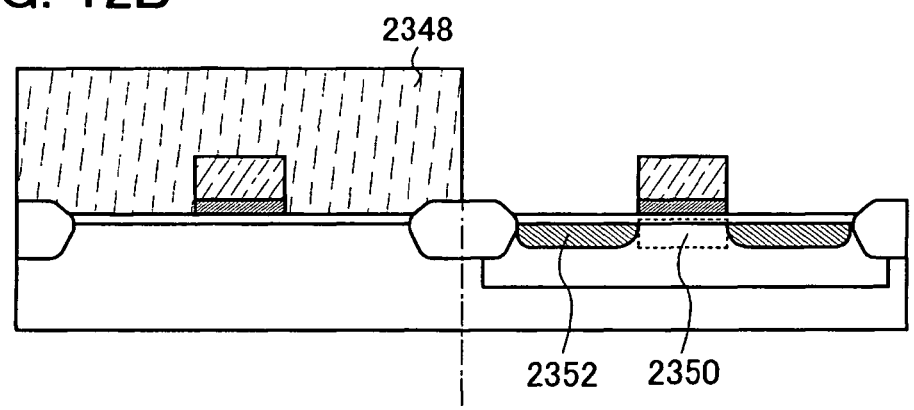

Next, a resist mask 2348 is selectively formed so as to cover the region 2304, and the region 2306 is doped with an impurity element, using the resist mask 2348 and the gate electrode 2342 as masks, so that impurity regions are formed (FIG. 12B). As an impurity element, an n-type impurity element or a p-type impurity element is used. As an n-type impurity element, phosphorus (P), arsenic (As), or the like can be used. As a p-type impurity element, boron (B), aluminum (Al), gallium (Ga), or the like can be used. Here, phosphorus (P) is used as the impurity element.

In FIG. 12B, by doping with an impurity element, impurity regions 2352 which form source and drain regions and a channel formation region 2350 are formed in the region 2306.

Figure 12C:
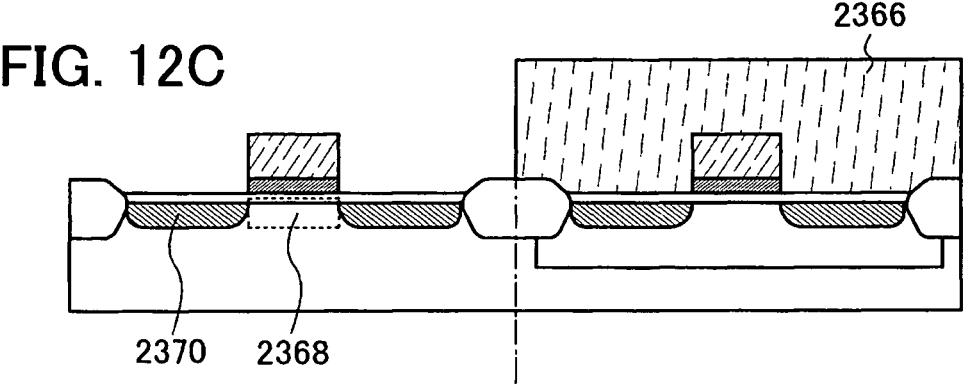

Next, a resist mask 2366 is selectively formed so as to cover the region 2306, and the region 2304 is doped with an impurity element, using the resist mask 2366 and the gate electrode 2340 as masks, so that impurity regions are formed (FIG. 12C). As the impurity element, an n-type impurity element or a p-type impurity element is used. As an n-type impurity element, phosphorus (P), arsenic (As), or the like can be used. As a p-type impurity element, boron (B), aluminum (Al), gallium (Ga), or the like can be used. Here, an impurity element (e.g., boron (B)) of a conductivity type different from that of the impurity element introduced into the region 2306 in FIG. 12B is used. As a result, impurity regions 2370 which form source and drain regions and a channel formation region 2368 are formed in the region 2304.

Figure 13A:
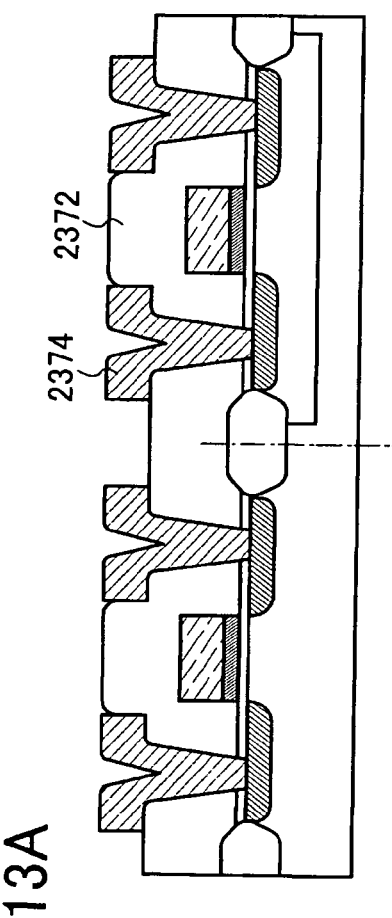
FIGS. 13A and 13B are views each showing an example of a method for manufacturing a semiconductor device of the present invention.

Next, a second insulating film 2372 is formed so as to cover the insulating films 2332 and 2334 and the gate electrodes 2340 and 2342. Then, wirings 2374, which are electrically connected to the impurity regions 2352 and 2370 formed in the regions 2306 and 2304 respectively, are formed over the second insulating film 2372 (FIG. 13A).

The second insulating film 2372 can be formed to have a single layer or stacked layer structure of an insulating film containing oxygen and/or nitrogen such as silicon oxide, silicon nitride, silicon oxynitride, or silicon nitride oxide, a film containing carbon such as DLC (diamond-like carbon), a film of an organic material such as epoxy, polyimide, polyamide, polyvinyl phenol, benzocyclobutene, or acrylic, or a film of a siloxane material such as a siloxane resin, which is formed by a CVD method, a sputtering method, or the like. Note that a siloxane material refers to a material including a Si—O—Si bond. Siloxane has a skeleton structure containing a bond of silicon (Si) and oxygen (O). As a substituent, an organic group containing at least hydrogen (e.g., an alkyl group or aromatic hydrocarbon) is used. Alternatively, a fluoro group can be used as the substituent. Further alternatively, both an organic group containing at least hydrogen and a fluoro group may be used as the substituent.

The wiring 2374 is formed to have a single layer or stacked layer structure of an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing any of those elements as its main component by a CVD method, a sputtering method, or the like. An alloy material containing aluminum as its main component corresponds to, for example, a material which contains aluminum as its main component and also contains nickel, or an alloy material which contains aluminum as its main component and which also contains nickel and one or both carbon and silicon. The wiring 2374 preferably employs, for example, a stacked layer structure including a barrier film, an aluminum-silicon (Al—Si) film, and a barrier film, or a stacked layer structure including a barrier film, an aluminum-silicon (Al—Si) film, a titanium nitride film, and a barrier film. Note that the barrier film refers to a thin film formed of titanium, a nitride of titanium, molybdenum, or a nitride of molybdenum. Aluminum and aluminum silicon have low resistance and are inexpensive; therefore, they are optimal materials for forming the wiring 2374. In addition, generation of a hillock of aluminum or aluminum silicon can be prevented when upper and lower barrier layers are formed. Furthermore, when the barrier film is formed of titanium, which is an element with a high reducing property, even when a thin natural oxide film is formed on the crystalline semiconductor film, the natural oxide film can be reduced; so that preferable contact with the crystalline semiconductor film can be obtained.

Note that the structure of transistors of the present invention is not limited to the one shown in the drawings. For example, a transistor with an inverted staggered structure, a FinFET structure, or the like can be used. A FinFET structure is preferable because it can suppress a short channel effect which occurs along with reduction in transistor size.

Figure 13B:
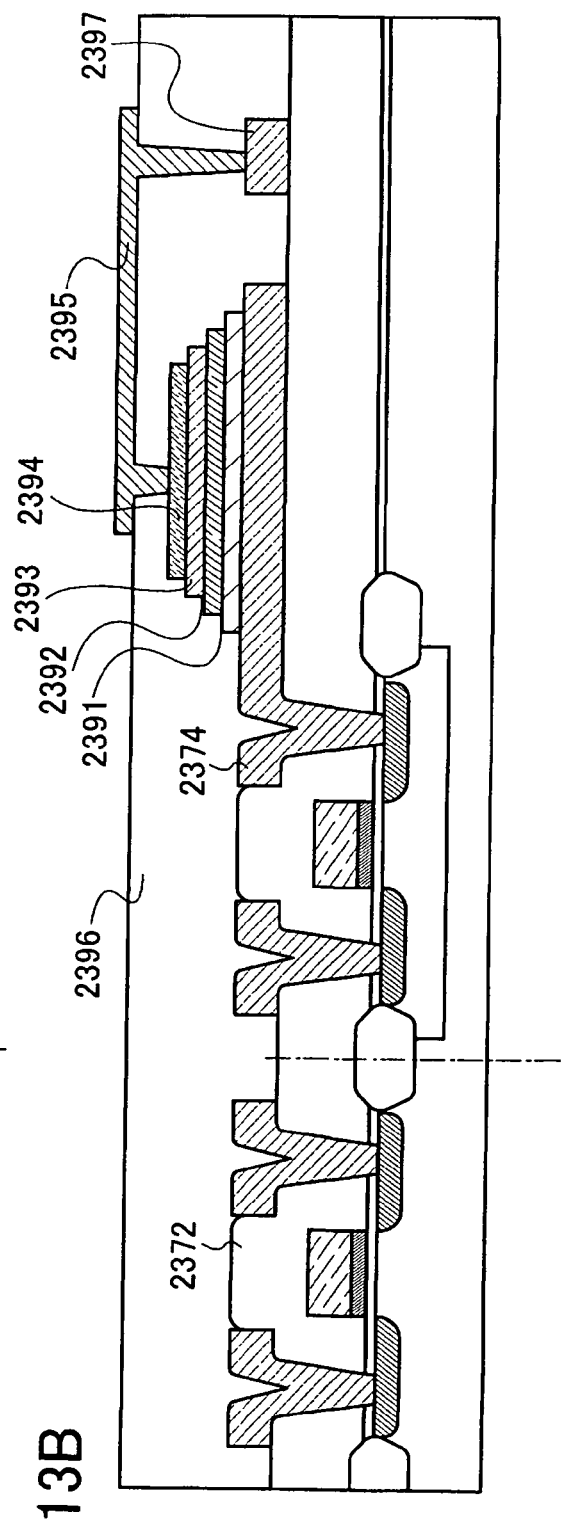

In this embodiment mode, the secondary battery is stacked over the wiring 2374 connected to the transistor. The secondary battery has a structure in which a current-collecting thin film, a negative electrode active material layer, a solid electrolyte layer, a positive electrode active material layer, and a current-collecting thin film are sequentially stacked (FIG. 13B). Therefore, the material of the wiring 2374, which also serve as the current-collecting thin film of the secondary battery, needs to have high adhesion to the negative electrode active material layer as well as low resistance. In particular, aluminum, copper, nickel, vanadium, or the like is preferably used.

The structure of a thin-film secondary battery is described next in detail. A negative electrode active material layer 2391 is formed over the wiring 2374. In general, vanadium oxide ($V_2O_5$) or the like is used. Next, a solid electrolyte layer 2392 is formed over the negative electrode active material layer 2391. In general, lithium phosphate ($Li_3PO_4$) or the like is used. Next, a positive electrode active material layer 2393 is formed over the solid electrolyte layer 2392. In general, lithium manganate ($LiMn_2O_4$) or the like is used. Lithium cobaltate ($LiCoO_2$) or lithium nickel oxide ($LiNiO_2$) may also be used. Next, a current-collecting thin film 2394 to serve as an electrode is formed over the positive electrode active material layer 2393. The current-collecting thin film 2394 needs to have high adhesion to the positive electrode active material layer 2393 as well as low resistance. For example, aluminum, copper, nickel, vanadium, or the like can be used.

Each of the above thin layers of the negative electrode active material layer 2391, the solid electrolyte layer 2392, the positive electrode active material layer 2393, and the current-collecting thin film 2394 may be formed by a sputtering technique or an evaporation technique. In addition, the thickness of each layer is preferably 0.1 to 3 μm.

Next, an interlayer film 2396 is formed by application of a resin. The interlayer film 2396 is etched to form a contact hole. The interlayer film is not limited to a resin, and another film such as a CVD oxide film may be used as well; however, a resin is preferably used in terms of flatness. Alternatively, the contact hole may be formed without using etching, but using a photosensitive resin. Next, a wiring layer 2395 is formed over the interlayer film 2396 and is connected to a wiring 2397. Thus, an electrical connection between the thin-film secondary battery and the element is secured.

With the foregoing structure, the semiconductor device of the present invention can have a structure in which transistors are formed using a single crystalline substrate and a thin-film secondary battery is formed thereover. Therefore, the semiconductor device of the present invention can achieve flexibility as well as thinning and reduction in size.

Note that a method of manufacturing a semiconductor device in this embodiment mode can be applied to the semiconductor device in other embodiment modes described in this specification.

This application is based on Japanese Patent Application serial no. 2006-350019 filed with Japan Patent Office on Dec. 26, 2006, the entire contents of which are hereby incorporated by reference.

What is claimed is:

1. A semiconductor device comprising an antenna and a chip, the chip comprising:
   a rectifier circuit portion comprising a first capacitor and a first diode;
   a protection control circuit portion comprising a first transistor, a second transistor, and a second diode;
   a bias circuit portion; and
   a protection/modulation circuit portion comprising a third transistor,
   wherein a first terminal of the first capacitor is electrically connected to a first terminal of the antenna,
   wherein a second terminal of the first capacitor is electrically connected to a first terminal of the first diode,
   wherein a second terminal of the first diode is electrically connected to a first terminal of the first transistor,
   wherein a second terminal of the first transistor is electrically connected to a first terminal of the second transistor, a first input terminal of the bias circuit portion, and an output terminal of the bias circuit portion,
   wherein a gate of the first transistor is electrically connected to a first terminal of the second diode,
   wherein a second terminal of the second transistor is electrically connected to a second terminal of the antenna,
   wherein a gate of the second transistor is electrically connected to a third input terminal of the bias circuit portion,
   wherein a second terminal of the second diode is electrically connected to the second terminal of the antenna,
   wherein a second input terminal of the bias circuit portion is electrically connected to the second terminal of the antenna,
   wherein a first terminal of the third transistor is electrically connected to the first terminal of the antenna,
   wherein a second terminal of the third transistor is electrically connected to the second terminal of the antenna, and
   wherein a gate of the third transistor is electrically connected to the output terminal of the bias circuit portion.

2. The semiconductor device according to claim 1, wherein at least one of the first diode and the second diode is a transistor.

3. The semiconductor device according to claim 1, wherein an input impedance of the chip is changed by an operation of the third transistor.

4. The semiconductor device according to claim 1, wherein the protection/modulation circuit portion comprises a load connected to the third transistor.

5. A semiconductor device comprising a first antenna, a second antenna, a chip, and a battery, the chip comprising:
   a rectifier circuit portion comprising a first capacitor and a first diode;
   a protection control circuit portion comprising a first transistor, a second transistor, and a second diode;
   a bias circuit portion; and
   a protection/modulation circuit portion comprising a switch,
   wherein a first terminal of the first capacitor is electrically connected to a first terminal of the first antenna,
   wherein a second terminal of the first capacitor is electrically connected to a first terminal of the first diode,
   wherein a second terminal of the first diode is electrically connected to a first terminal of the first transistor,
   wherein a second terminal of the first transistor is electrically connected to a first terminal of the second transistor, a first input terminal of the bias circuit portion, and an output terminal of the bias circuit portion,
   wherein a gate of the first transistor is electrically connected to a first terminal of the second diode,
   wherein a second terminal of the second transistor is electrically connected to a second terminal of the first antenna,
   wherein a gate of the second transistor is electrically connected to a third input terminal of the bias circuit portion,
   wherein a second terminal of the second diode is electrically connected to the second terminal of the first antenna,
   wherein a second input terminal of the bias circuit portion is electrically connected to the second terminal of the first antenna,
   wherein a first terminal of the switch is electrically connected to the first terminal of the first antenna,
   wherein a second terminal of the switch is electrically connected to the second terminal of the first antenna,
   wherein a control terminal of the switch is electrically connected to the output terminal of the bias circuit portion,
   wherein the battery stores electric power supplied through the second antenna,
   wherein the battery comprises a first current-collecting thin film, a negative electrode active material layer stacked over the first current-collecting thin film, a solid electrolyte layer stacked over the negative electrode active material layer, a positive electrode active material layer stacked over the solid electrolyte layer, and a second current-collecting thin film stacked over the positive electrode active material layer, and
   wherein the first current-collecting thin film is a wiring electrically connected to a first terminal of a transistor of the chip.

6. The semiconductor device according to claim 5, wherein the first antenna and the second antenna receive signals with different frequencies.

7. The semiconductor device according to claim 5, wherein the battery includes a lithium battery, a nickel-metal-hydride battery, or an electric double layer capacitor.

8. The semiconductor device according to claim 5, wherein the switch is a transistor.

9. The semiconductor device according to claim 5, wherein an input impedance of the chip is changed by an operation of the switch.

10. The semiconductor device according to claim 5, wherein the protection/modulation circuit portion comprises a load connected to the switch.

11. A semiconductor device comprising an antenna, a chip, and a battery, the chip comprising:
  a protection control circuit portion;
  a protection/modulation circuit portion electrically connected to the antenna and comprising a switch;
  a circuit configured to output a bias signal in accordance with a magnitude of a voltage supplied through the antenna;
  a logic circuit configured to output a first modulation signal; and
  a bias circuit portion configured to receive the first modulation signal from the logic circuit and generate a second modulation signal from the bias signal and the first modulation signal,
  wherein the protection/modulation circuit portion is configured to change an input impedance of the chip in accordance with the second modulation signal,
  wherein an output terminal of the bias circuit portion is electrically connected to a first input terminal of the bias circuit portion through a first resistor,
  wherein an output terminal of the protection control circuit portion is electrically connected to the first input terminal of the bias circuit portion through a second resistor,
  wherein the logic circuit is electrically connected to the first input terminal of the bias circuit portion through a third resistor,
  wherein the antenna and the chip are formed over a substrate,
  wherein the battery comprises a first conductive film and a second conductive film,
  wherein the first conductive film and a first wiring are electrically connected through a first conductive particle included in an adhesive resin,
  wherein the second conductive film and a second wiring are electrically connected through a second conductive particle included in the adhesive resin,
  wherein the first wiring is electrically connected to a first terminal of a first transistor of the chip, and
  wherein the second wiring is electrically connected to a first terminal of a second transistor of the chip.

12. The semiconductor device according to claim 11, wherein the switch is a transistor.

13. The semiconductor device according to claim 11, wherein the input impedance of the chip is changed by an operation of the switch.

14. The semiconductor device according to claim 11, wherein the protection/modulation circuit portion comprises a load connected to the switch.

15. A semiconductor device comprising:
  a protection control circuit portion;
  a protection/modulation circuit portion electrically connected to an antenna;
  a circuit configured to output a bias signal in accordance with a magnitude of a voltage supplied through the antenna;
  a logic circuit configured to output a first modulation signal; and
  a bias circuit portion configured to receive the first modulation signal from the logic circuit and generate a second modulation signal from the bias signal and the first modulation signal,
  wherein the protection/modulation circuit portion is configured to change an input impedance of the semiconductor device in accordance with the second modulation signal,
  wherein an output terminal of the bias circuit portion is electrically connected to a first input terminal of the bias circuit portion through a first resistor,
  wherein an output terminal of the protection control circuit portion is electrically connected to the first input terminal of the bias circuit portion through a second resistor, and
  wherein the logic circuit is electrically connected to the first input terminal of the bias circuit portion through a third resistor.

16. The semiconductor device according to claim 15, wherein the circuit configured to output the bias signal is a comparison circuit.

17. The semiconductor device according to claim 15, wherein the protection/modulation circuit portion, the circuit configured to output the bias signal, the logic circuit and the bias circuit portion are formed over the same substrate.

18. The semiconductor device according to claim 15 wherein the protection/modulation circuit portion comprises a transistor, a gate of the transistor being connected to an output of the bias circuit portion.

19. The semiconductor device according to claim 18 wherein the protection/modulation circuit portion further comprises a load connected to the transistor.

20. The semiconductor device according to claim 1,
  wherein the bias circuit portion comprises a fourth transistor, a fifth transistor, a sixth transistor, a seventh transistor, and an eighth transistor,
  wherein a first terminal of the fourth transistor and a first terminal of the fifth transistor are electrically connected to the second terminal of the first diode,
  wherein a gate of the fourth transistor, a second terminal of the fourth transistor, a gate of the fifth transistor, and a first terminal of the sixth transistor are electrically connected to each other,
  wherein a second terminal of the fifth transistor and a first terminal of the seventh transistor are electrically connected to the output terminal of the bias circuit portion,
  wherein a second terminal of the sixth transistor and a second terminal of the seventh transistor are electrically connected to a first terminal of the eighth transistor,
  wherein a gate of the sixth transistor is electrically connected to the second input terminal of the bias circuit portion,
  wherein a gate of the seventh transistor is electrically connected to the first input terminal of the bias circuit portion
  wherein a gate of the eighth transistor is electrically connected to the third input terminal of the bias circuit portion, and
  wherein the gate of the seventh transistor and the first terminal of the seventh transistor are electrically connected to each other through a first resistor.

21. The semiconductor device according to claim 15,
  wherein a voltage of the second modulation signal is determined by a voltage of the first modulation signal, a voltage of the bias signal, a ratio of a resistance of the first resistor and a resistance of the second resistor, and a ratio of the resistance of the first resistor and a resistance of the third resistor.

* * * * *